(12) United States Patent
Beheydt et al.

(10) Patent No.: US 8,781,003 B2
(45) Date of Patent: Jul. 15, 2014

(54) SPLICING OF ENCRYPTED VIDEO/AUDIO CONTENT

(75) Inventors: Samie Beheydt, Geluwe (BE); Jan De Lameillieure, Kortrijk (BE); James Ka Sin Au, Richmond (CA)

(73) Assignee: Cisco Technology, Inc., San Jose, CA (US)

( * ) Notice: Subject to any disclaimer, the term of this patent is extended or adjusted under 35 U.S.C. 154(b) by 1081 days.

(21) Appl. No.: 12/175,101

(22) Filed: Jul. 17, 2008

(65) Prior Publication Data

US 2010/0014594 A1 Jan. 21, 2010

(51) Int. Cl.
*H04N 11/02* (2006.01)
(52) U.S. Cl.
USPC .................................................. 375/240.26
(58) Field of Classification Search
None
See application file for complete search history.

(56) References Cited

U.S. PATENT DOCUMENTS

| 6,049,569 | A | 4/2000 | Radha et al. .................. 375/240 |
| 6,993,081 | B1 | 1/2006 | Brunheroto et al. ..... 375/240.28 |
| 7,096,481 | B1 | 8/2006 | Forecast et al. ................. 725/32 |
| 7,096,488 | B1 | 8/2006 | Zhang et al. .................. 725/105 |
| 7,188,354 | B2 * | 3/2007 | Lyons et al. ..................... 725/32 |
| 2005/0169175 | A1 * | 8/2005 | Apostolopoulos ............ 370/230 |
| 2007/0140358 | A1 * | 6/2007 | Schwartz et al. ........ 375/240.26 |
| 2009/0067621 | A9 * | 3/2009 | Wajs .............................. 380/42 |
| 2009/0083186 | A1 * | 3/2009 | Dharmaji et al. ............... 705/50 |
| 2009/0199236 | A1 * | 8/2009 | Barrett et al. .................... 725/36 |
| 2009/0225983 | A1 * | 9/2009 | Reinoso et al. ............... 380/212 |

FOREIGN PATENT DOCUMENTS

WO   WO 02/09425 A1   1/2002

OTHER PUBLICATIONS

International Search Report dated Oct. 15, 2009 Application No. PCT/US2009/050378.
"Seamless splicing for MPEG-2 bit streams," Series J: Cable Networks and Transmission of Television, Sound Programme and Other Multimedia Signals, Miscellaneous, International Telecommunication Union, ITU-T Recommendation J.189, Jul. 2002, 15 pgs.
"Digital program insertion cueing message for cable television systems," Series J: Cable Networks and Transmission of Television, Sound Programme and Other Multimedia Signals, Miscellaneous, International Telecommunication Union, ITU-T Recommendation J.181, Mar. 2001, 26 pgs.

(Continued)

*Primary Examiner* — Chirag Shah
*Assistant Examiner* — Amar Persaud
(74) *Attorney, Agent, or Firm* — Merchant & Gould P.C.

(57) ABSTRACT

System and method for performing a splice operation on an encrypted or unencrypted MPEG-2 transport stream. A splice trigger is received at a pre-conditioning encoder. In response, the encoder generates, e.g., an SCTE-35 cue message that is intended to be received by a splicer. Also in response to the splice trigger, the encoder encodes/conditions a network feed such that a decoder buffer delay reaches a predefined value at a video frame of the network feed that corresponds to a splice point indicated by the SCTE-35 cue message. The network feed may then be encrypted in a known fashion. At the splicer, another feed is switched into the stream at the splice point, wherein the another feed is encoded such that a decoder buffer delay at a video frame of the another feed corresponding to the splice point is the same as the predefined value. The predefined value is defined as DTS-STC, where DTS is a Decoding Time Stamp and STC is a System Time Clock. The pre-conditioning encoder generates around the splice point audio PES packets that contain a single aligned audio frame.

33 Claims, 30 Drawing Sheets

(56) References Cited

OTHER PUBLICATIONS

"Information Technology—Generic coding of moving pictures and associated audio information: systems," Series H: Audiovisual and Multimedia Systems, Infrastructure of audiovisual services—Transmission multiplexing and synchronization, International Telecommunication Union, ITU-T Recommendation H.222.0, Feb. 2000, 171 pgs. (E-filed/uploaded in 4 parts: NPL5a-d).

Hurst et al., "MPEG Splicing: A New Standard for Television—SMPTE 312M," SMPTE Journal, vol. 107, No. 11, Nov. 1998, XP-000804761, pp. 978-988.

Chinese Second Office Action dated Jul. 15, 2013 Application No. 200980127658.6, 8 pgs.

Chinese First Office Action dated Oct. 29, 2012 Application No. 200980127658.6, 17 pgs.

\* cited by examiner

After Splicing, audio frame n is shifted over s1+s2 w.r.t. video frame k.
The shift s1+s2 is the lip sync error introduced by this seamless splice.

SPLICING OF ENCRYPTED VIDEO/AUDIO CONTENT

FIELD OF THE INVENTION

The present disclosure relates to systems and methods for splicing digitally encoded video and/or audio, such as video and audio encoded in an MPEG-2 transport stream.

BACKGROUND OF THE INVENTION

As is well-known in the art, MPEG (i.e., MPEG-1, MPEG-2, MPEG-4, H.264) compressed video and audio streams are mapped into MPEG-2 Transport Streams as Elementary Streams (ES) packed into Packetized Elementary Stream (PES) packets, which, in turn, are packed in MPEG-2 Transport Stream (TS) packets. The PES packets contain a PES header which contains, among other things, a Presentation Time Stamp (PTS) and optionally also a Decoding Time Stamp (DTS) (in case the DTS is not present, it is considered equal to the PTS). The DTS tells the decoder when to decode a video/audio frame, while the PTS tells the decoder when to display (i.e., present) the video/audio frame. Both the DTS and PTS values are actually time events that are relative to a time reference that is also transmitted in the MPEG-2 Transport Stream. This time reference is called the System Time Clock (STC) and is coded in the TS as samples of a 27 MHz counter which are called the Program Clock Reference (PCR) fields.

Traditional solutions for splicing of video and audio rely on the fact that the audio and video content is received in the clear, i.e., is not encrypted. The reason for this is threefold.

First, the splicer must find a valid exit point in the head stream and must also find a valid entry point in the tail stream. In order to do this, it must interpret the frame information which must be in the clear.

Second, all MPEG compression standards (MPEG-1, MPEG-2, MPEG-4) contain a decoder buffer model with which the bitstreams coming out of an encoder must comply. When two segments of an MPEG compressed video stream, both of which are compliant with the MPEG decoder buffer model, are "glued" together, then in general the resulting MPEG stream will not comply with the MPEG decoder buffer model. In order to solve this problem, traditional MPEG splicing solutions are transrater based, which means that they modify the size of the video frames around the splice points in order to generate a valid video stream. In order to do this, the splicer needs to "dig deep" into the frame information and modify it, which requires that this information be available in the clear.

A third reason why traditional splicing solutions rely on unencrypted content has to do with the way audio is handled at a splice point. Audio frames do not have the same duration as video frames. As a consequence, splice points in video and audio do not coincide exactly. Therefore, audio is spliced at an audio frame boundary near the video splice point. After a splice, the audio is shifted slightly in time with respect to video, because there is no audio gap in the spliced output. This shift can lead to noticeable lip sync problems, especially due to accumulation of the shift after a number of splices. A splicer can compensate for the previously accumulated shift by taking an alternative audio frame boundary as splice point. Also because of the different frame duration, the number of audio frames to be replaced by, e.g., an advertisement is not fixed, requiring flexibility in the choice of audio frame for splicing.

Audio frames are packed in PES packets just like video. It is common practice that a number of audio frames are packed together in one PES packet because of bandwidth efficiency. Therefore, the ideal audio splice point can be in the middle of a given PES packet. If the audio content is not in the clear, it is impossible to splice at the ideal audio splice point, since this involves de-packing the audio frames and re-packing some of them in a new PES packet.

Valid splice points are traditionally signaled in the MPEG-2 Transport Stream by means of STCE-35 cue messages. These messages contain the PTS value of the video frame that corresponds with the intended splice point. The PTS value in the SCTE-35 message tells the splicer when to splice from the head stream to the tail stream. Optionally, the SCTE-35 cue message can also contain a break_duration field that tells the splicer after how much time it must splice back to the head stream.

In light of the foregoing, prior art MPEG splicing techniques require PES packets that are in the clear. However, there are many instances when splicing is desired, but the PES packets have already been encrypted, and thus the video and audio streams are not available in the clear. There is thus a need to provide systems and methodologies that enable splicing of MPEG streams even when those streams are not in the clear.

BRIEF DESCRIPTION OF THE DRAWINGS

FIG. 29 for video program switching, and FIG. 30 for audio splicing).

DETAILED DESCRIPTION

Overview

Figure 1:
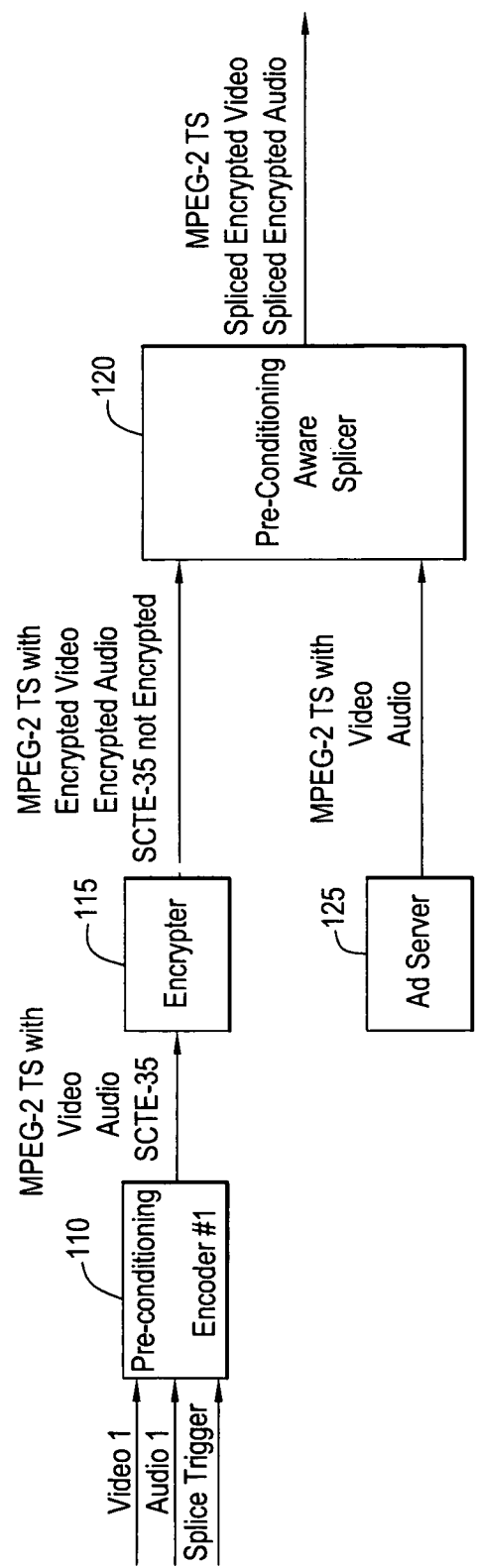
FIGS. 1-2 are block diagrams of two possible embodiments of the present invention.

Embodiments of the present invention provide systems and methodologies that enable the splicing of compressed digital video and audio streams that are carried in an MPEG-2 Transport Stream and that may have been encrypted prior to the splicing operation.

In accordance with an embodiment of the invention, there is provided a pre-conditioning video/audio encoder and a splicing device that is aware or cognizant of the pre-conditioning performed by the encoder. The encryption device is located somewhere in the path between encoder and splicer. It is noted that the encryption device, itself, may be a conventional encryption device and is, therefore, not necessarily part of this invention. The encoder receives a trigger (e.g., via a hard contact) that it must prepare its output (i.e., an MPEG-2 Transport Stream containing both compressed video and audio) for a splicing event. In order to do so, the encoder inserts, e.g., an SCTE-35 cue message into its output a pre-determined amount of time (e.g., 4 seconds) ahead of the actual splice point. The STCE-35 cue message contains a PTS value that corresponds with the PTS value of the actual splice point of the video. Upon reception of the splice event trigger, the pre-conditioning encoder encodes the video streams in such a way that the decoder buffer delay (i.e., the DTS−STC value) reaches a certain pre-defined value at the video frame that corresponds with the splice point. When the video frame that corresponds with the intended splice point is processed by the encoder, the encoder closes the group of pictures (GOP) and the frame is encoded as a Random Access Point (RAP), i.e., a video frame that provides a clean decoding start point. This RAP frame is mapped into a new PES packet which, in turn, starts a new MPEG-2 packet.

For the audio stream, all audio frames generated within, e.g., 1 second around the intended splice point, are encoded as audio Random Access Points (RAP) and are each mapped into a separate PES packet each starting a new MPEG-2 packet (normally more than 1 audio frame is carried in the same PES packet in order to save bandwidth). This allows a sufficiently fine control of relative shift of audio with respect to video (and thereby addressing the issue described in the third problem described in the Background section above). It also allows a more precise match in audio duration of an advertisement and an avail in a network feed. It is noted that an audio RAP is an audio frame aligned at the start of a PES packet, which in turn is at the beginning of a payload of a transport stream packet.

The output of the pre-conditioning encoder is encrypted by an encryption device and the resulting Transport Stream is received by the splicing device. The encryption device encrypts the video and audio streams but does not encrypt the STCE-35 cue messages.

The splicing device receives the SCTE-35 cue message and extracts the PTS value of the splice point, which tells the splicer on which audio/video frame it must perform a splice. In order to be able to interpret the PTS values of video and audio, the PES headers must be in the clear. Therefore, the encryption device is only allowed to perform ES level encryption, which encrypts the PES payload but leaves the PES headers in the clear. Alternatively, the PES headers can be encrypted but the PES header information must then be carried unencrypted in another way, e.g. by copying it into private data of an MPEG-2 adaptation field.

At the moment the video/audio frame with a PTS corresponding with the intended splice point enters the splicer, the latter splices from the original video/audio source (i.e., the head stream) to the replacing source (i.e., the tail stream). Because of the video and audio pre-conditioning described above splicing is nothing more than a switch on MPEG-2 TS packet boundaries, which makes the splicer device very simple (note that the splicer must still update PTS/DTS/PCR values in order to make these fields continuous over the splice points).

For the tail stream two options exist. In the first option, the tail stream is also generated by a pre-conditioning encoder (triggered to prepare for a splice at the same moment as the head stream encoder). This application is called seamless program switching. In the second option, the tail stream is provided by an advertisement ("ad") server where the application is seamless ad insertion. In this case, the ad stored on the ad server is preferably encoded in a pre-conditioned format, i.e., it has the same format as if it was provided by a pre-conditioning encoder. In both cases, because of the closing of the GOP, the insertion of RAPs at the splice points, the decoder buffer pre-conditioning and the special way of PES packetization and MPEG-2 TS packetization, the splice will be seamless. Gluing the pre-conditioned head and tail stream in the splicing device concatenates both streams at a point where they have the same pre-conditioned DTS−STC value. The splice result is a concatenated stream that does not violate decoder buffer conditions, assuming that the splicing device does not alter the drain timing of the TS packets (i.e., each MPEG-2 packet experiences a constant delay through the splicer, except at the splice points).

In the case of ad insertion, the ad will have a finite length and after it is finished the splicer must switch back to the head stream (i.e., the network in-point). Therefore, the encoder must be made aware of the length of the ad since it must prepare for another splice event and perform its pre-conditioning at the right moment. The length of the ad can be included in the break-duration field of the SCTE-35 cue message, which can be used to notify the splicing device that it must switch back to the head stream. If the break_duration field is not available, a separate SCTE-35 cue message must be inserted by the pre-conditioning encoder at the network in-point.

Thus, embodiments of the present invention relate to a video and audio encoder, that generates streams that can be spliced by a splicing device that does not access the elementary streams, which may be encrypted, and that preserves the time between consecutive MPEG-2 transport stream packets except at the splice points. The encoders are characterized in that for video, the Random Access Point is the start of a closed GOP, it is packed aligned in a PES packet which in turn is aligned in an MPEG-2 TS packet, and the DTS−STC distance at the Random Access Point is at a predefined level. For audio, the encoder is characterized in that it generates a number of possible random access points around the video splice point, each point being an audio frame packed aligned in a PES packet which, in turn, is aligned in an MPEG-2 TS packet, leading to a PES stream with short PES packets around the splice point.

Description of Example Embodiments

FIG. 1 shows a block diagram of one possible implementation of the present invention (ad insertion). A pre-conditioning encoder 110 receives video and audio signals, as well as a splice trigger that is indicative of a splice event that is to occur in the near future. The encoder 110 may encode the video and audio in accordance with a video/audio compression standard, such as MPEG-2 and output an MPEG-2 transport stream. The splice trigger is transformed into a well-known SCTE-35 cue message. The encoded elementary streams (ES) are passed to Encrypter 115, which encrypts the payloads of the individual packets that comprise the transport stream. The SCTE-35 cue messages are preferably not encrypted (if they are, sufficient information must be provided to allow the splicer to decrypt them). Note that the splice trigger could also be transported from the encoder to the splicer by a means other than SCTE-35.

The thus-encrypted transport stream is then passed to a Pre-Conditioning Aware (or Cognizant) Splicer (hereinafter "Splicer") 120. Splicer 120 is responsible for splicing, e.g., an advertisement ("ad") delivered from Ad Server 125 into the main "network stream" supplied by Encrypter 115. Such an ad is typically intended to be spliced into a predetermined location in the network stream. Such a location is commonly referred to as an "avail." Ad Server 125 supplies, e.g., an MPEG-2 transport stream to Splicer 120. That stream is also "pre-conditioned" like the transport stream supplied by Pre-Conditioning Encoder 110. The pre-conditioning of the stream is described in detail below, as are the steps for implementing the desired splicing function.

Ultimately, Splicer 120 delivers a spliced encrypted, e.g., MPEG-2, transport stream that is ready to be transmitted for, e.g., a head end of a controlled access (CA) network, such as a cable television network.
Note that the Transport Stream coming from the ad server could also be encrypted (not shown in FIG. 1).

Figure 2:
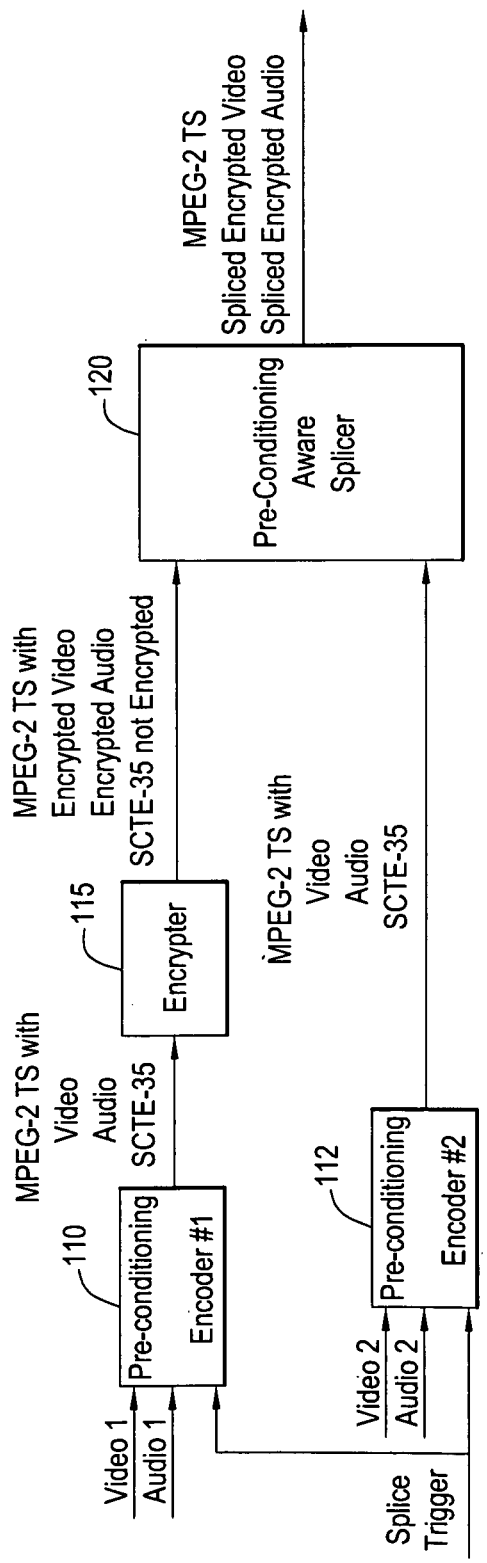

FIG. 2 depicts a very similar arrangement as compared to what is depicted in FIG. 1. In the case of FIG. 2, however, instead of splicing an advertisement into a network stream, Splicer 120 is used to switch between a first program supplied by, e.g., Encoder 110 and a second program supplied by Pre-Conditioning Encoder 112. Note that the Transport Stream coming from the second Pre-Conditioning encoder could also be encrypted (not shown in FIG. 2).

Ad insertion and program switching with pre-conditioning is a joint effort between the network feed/ad encoders (110, 112, 125) and splicer 120. The encoders provide the necessary Random Access Point (RAP) pictures (frames) and decoder buffer pre-conditioning at the splice points. Splicer 120 performs the actual splicing by gluing the network feed and ad Transport Stream packets at the splice points. More specific details regarding the pre-conditioning in the encoders is provided later herein.

1. Ad Insertion with Pre-Conditioning
1.1 General Concept

Figure 3:
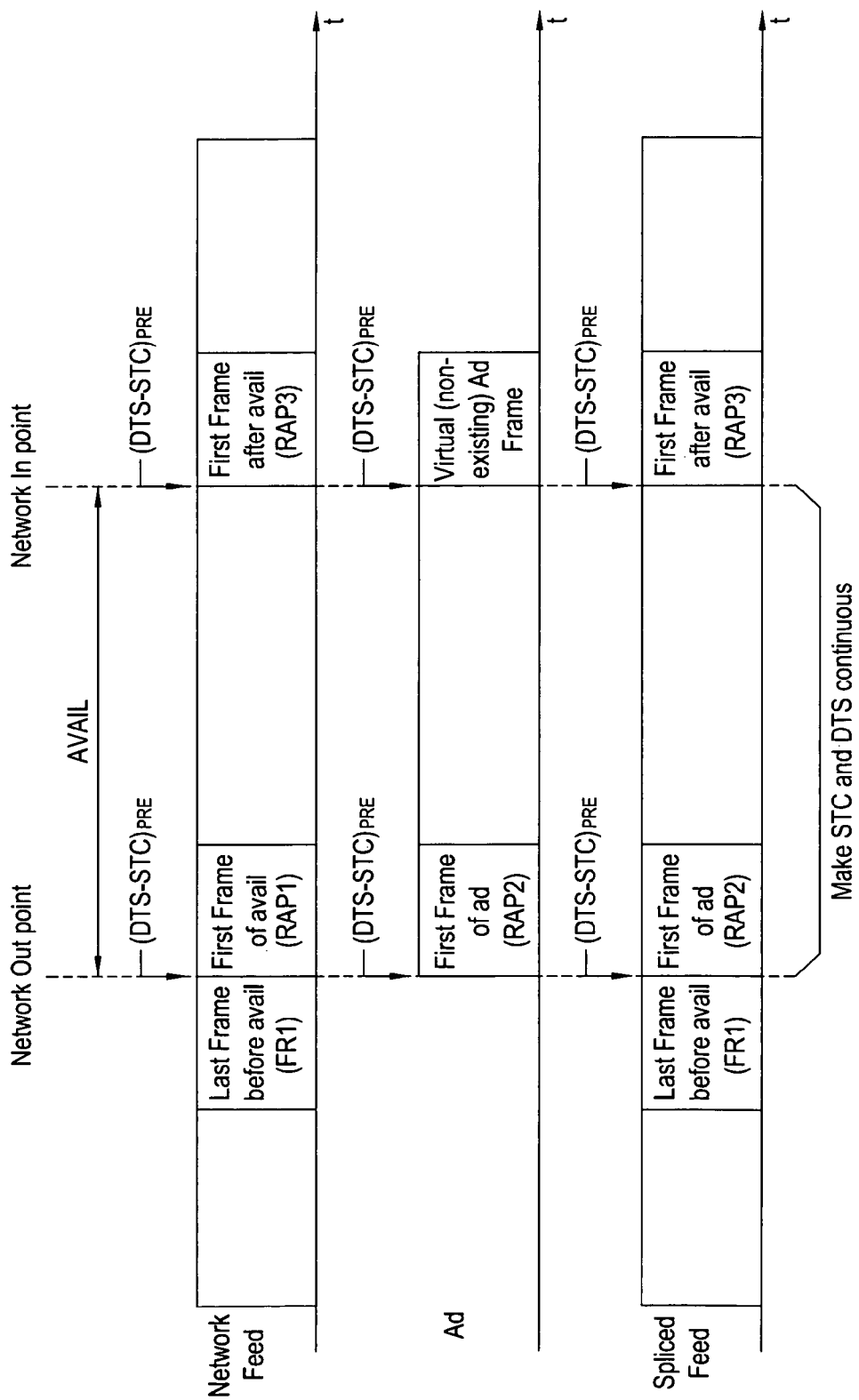
FIG. 3 summarize ad insertion in accordance with an embodiment of the present invention.

FIG. 3 depicts the video pre-conditioning for both network feed and ad and the resulting format of the spliced video feed. Note that in this Figure abstraction is made of possible delays between network feed, ad and spliced feed, which must be handled by the splicer.

Before the first splice event occurs, the spliced feed contains all frames of the network feed. The last frame of the network feed that is included in the spliced feed before the actual splicing starts is indicated in FIG. 3 as FR1.

The first splice event starts at the network out point of the network feed. At this point, the pre-conditioning encoder generates a Random Access Point (RAP), indicated in FIG. 3 as RAP1. RAP1 has a pre-conditioned DTS–STC value indicated in FIG. 3 as $(DTS–STC)_{PRE}$. RAP1 is actually the first frame of the avail of the network feed and is also the first frame in the network feed that is suppressed by the splicer and that will be replaced by the first frame of the ad.

The first frame of the ad is encoded as a RAP and is indicated in FIG. 3 as RAP2. RAP2 has a pre-conditioned DTS–STC value indicated in FIG. 3 as $(DTS–STC)_{PRE}$. The ad ends in such a way that if a virtual ad frame were to be added right after the ad, it would have a pre-conditioned DTS–STC value, indicated in FIG. 3 as $(DTS–STC)_{PRE}$.

At the network out point, the spliced feed will thus contain the first frame of the ad (RAP2) and will include all subsequent ad frames until the ad is finished and the network in point of the network feed is reached. The virtual frame that is appended at the end of the ad is a non-existing frame. It is used only to define the DTS–STC pre-conditioning of the ad and is as such no part of the spliced output.

After the network in point, the first frame of the network feed that is included in the spliced feed is RAP3 (see FIG. 3). RAP3 is a Random Access Point frame that starts a closed GOP (a closed GOP is a GOP of which all pictures can be correctly decoded without the previous GOP). RAP3 also has a pre-conditioned DTS–STC value, indicated in FIG. 3 as $(DTS–STC)_{PRE}$. From that point onwards, the spliced feed will contain all subsequent network feed frames until the next ad insertion event is started.

Note that the number of video frames in the avail of the network feed must be identical to the number of video frames of the ad.

Because of the DTS–STC pre-conditioning at the splice points, the decoder buffer level of the spliced feed will be compliant with the applicable decoder buffer model.

For the insertion of the video of an ad in the "avail" of a network video feed, the number of network feed video frames that have to be replaced by ad video frames is exactly the same. However, this is not the case for audio. Audio frames have a different duration than video frames. Therefore, the splice out point and splice in point for audio and video do not coincide. As a consequence, the number of network audio frames in an avail is not fixed, and the splicer has to be able to cut off the network feed and ad at several audio frame boundaries near the end of the avail.

It is common use in audio packetization that several audio frames are packed in one PES header, reducing the PES header overhead. Moreover, it is not unusual that the first audio frame that commences in a PES packet is not aligned with the PES packet payload boundary, reducing the stuffing for alignment. However, if the splicer is restricted to splice at PES boundaries (and thus at TS boundaries) because of the possible encryption of the payload, splicing for ad insertion is only possible if the audio frames in the network feed near the splice out and splice in point, and the audio frames near the end of the ad are packed in a single audio frame PES packet with alignment, i.e., the first byte in the PES packet payload is the first byte of the audio frame.

Figure 4:
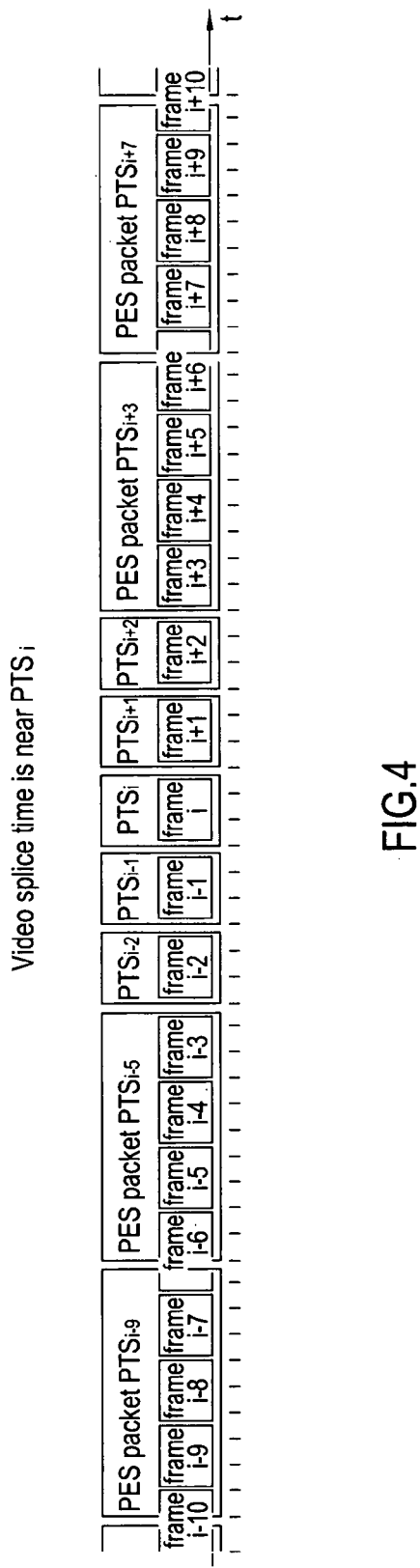
FIGS. 4-5 show treatment of audio frames in accordance with an embodiment of the present invention.

This is shown in FIG. 4 wherein the video splice time is near PTSi and the small vertical marks beneath the Packetized Elementary Stream (PES) packets indicate transport stream packet boundaries.

Figure 5:
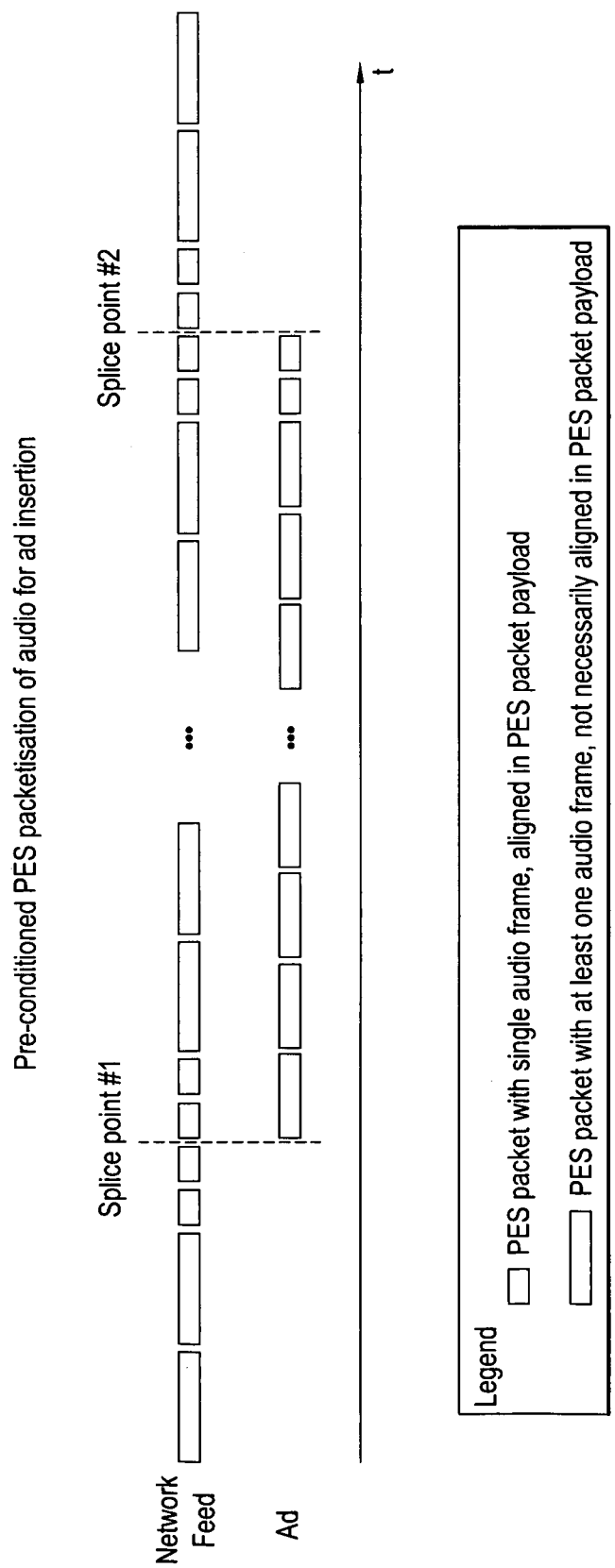

FIG. 5 illustrates how the audio encoders of network feed and ad have to pre-condition the packetization near the splice points. With the single audio frame PES packets near splice out and splice in point, the splicer can pick for splicing the frame boundary nearest to the video splice point. With the single audio frame PES packets near the end of the ad or near the splice-in point of the network feed, the splicer can pick for splicing the frame boundary that fits best for splicing. At least one of both ad and network feed should have the single frame audio PES packets near the end of the ad or around the splice-in point.

When switching from network feed to ad, the STC timebase of the spliced feed is preferably kept equal to that of the network feed. During the insertion of the ad in the spliced output, the PTS, DTS and STC values of the ad are modified by the splicer 120 in such a way that there are no discontinuities in the PTS, DTS and STC values. Although DTS–STC values are pre-conditioned (i.e., the difference between DTS and STC), there will in general be an offset between DTS and STC values of the network feed and the ad.

1.2 Ad Timebase Correction

As described above, in the preferred way to perform pre-conditioned ad insertion, the STC timebase of the spliced feed is kept equal to that of the network feed. Since both timebases are in general not equal, a problem may occur when inserting the ad into the network feed. This section describes this problem and provides a solution to this problem.

Figure 6:
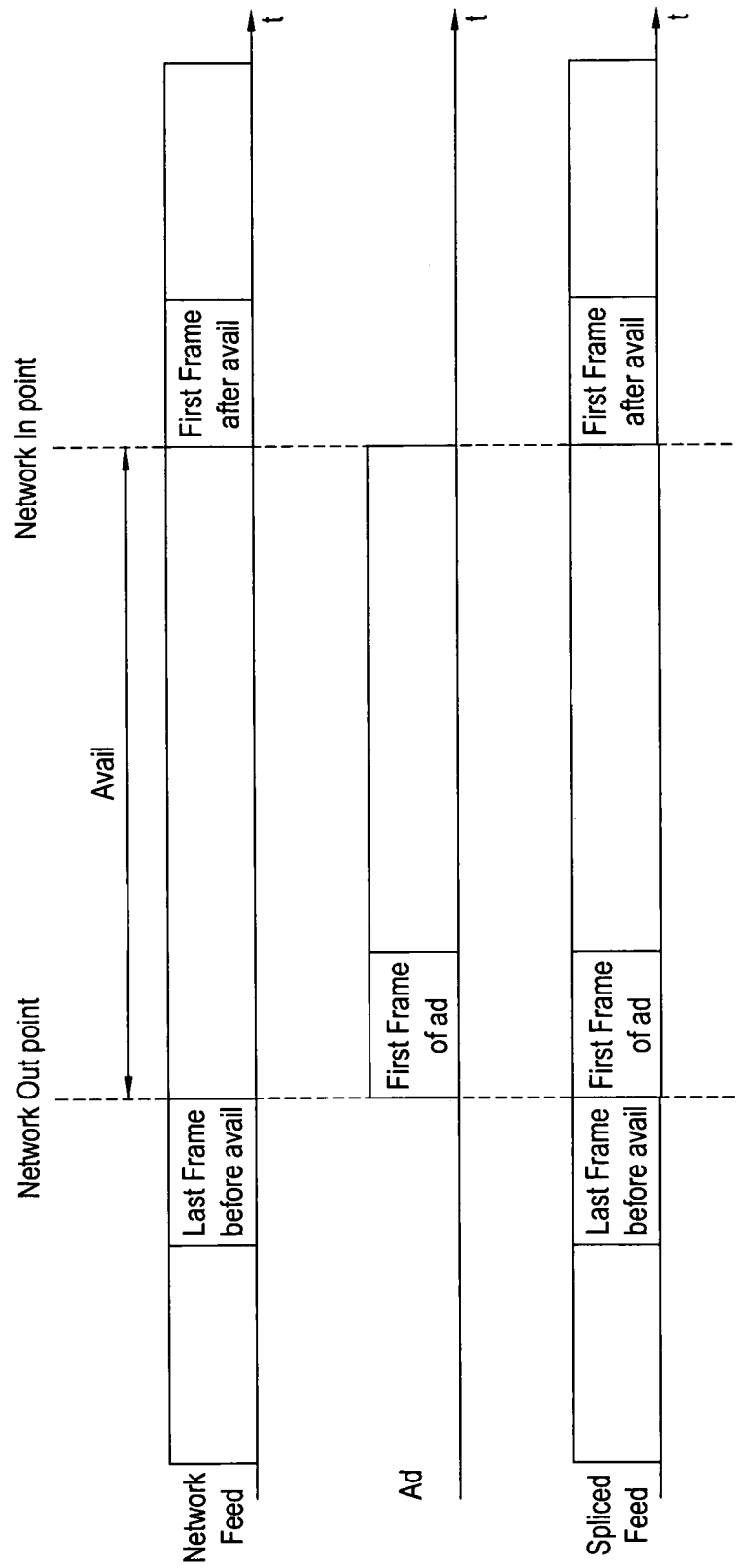
FIG. 6 depicts the space in the network feed into which an ad is "glued" in accordance with an embodiment of the present invention.

A principle of the pre-conditioned ad insertion operation that is performed in splicer 120 can be explained by saying that the network feed contains a gap (i.e., an "avail") in which the ad must be glued. This is depicted in FIG. 6.

A condition on which the present invention is based is that both the network feed and the ad are sent from the input to the output of splicer 120 with a constant delay (which in general is different for network feed and ad). This means that the transmission duration of the avail and the ad at the output of splicer 120 is identical to the transmission duration of the avail/ad at the input of splicer 120 (transmission duration is defined as number of bits divided by the average bitrate).

In order for the ad to fit perfectly in the avail, the transmission duration of the avail must be equal to the transmission duration of the ad. Even if the number of frames in an avail and an ad are equal, this in general does not necessarily mean that their respective transmission durations are equal.

If the decoder buffer pre-conditioning as described more fully later herein is applied to the network feed and ad, however, it can be proven that the transmission duration of the network feed and the ad are indeed equal. This is done as follows.

Figure 7:
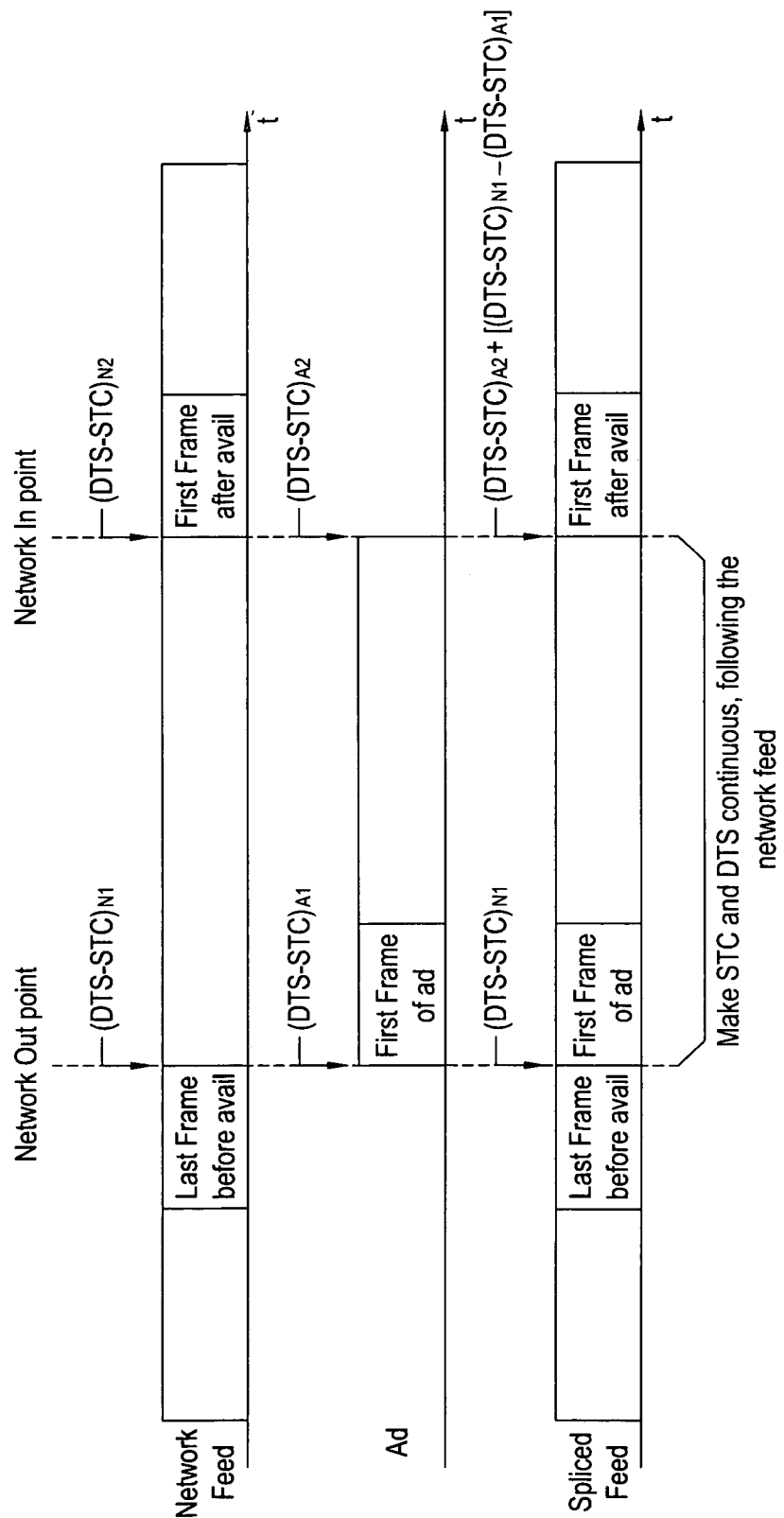
FIG. 7 shows decoder buffer pre-conditioning used for ad insertion in accordance with embodiments of the present invention.

FIG. 7 shows the decoder buffer pre-conditioning that is preferably used in pre-conditioned ad insertion.

According to the decoder buffer pre-conditioning, the following equalities are true (see further in this document):

$$(DTS-STC)_{N1}=(DTS-STC)_{N2} \quad (1)$$

$$(DTS-STC)_{A1}=(DTS-STC)_{A2} \quad (2)$$

If the following notations are introduced:
$(DTS-STC)_{N1}=DTS_{N1}-STC_{N1}$
$(DTS-STC)_{N2}=DTS_{N2}-STC_{N2}$
$(DTS-STC)_{A1}=DTS_{A1}-STC_{A1}$
$(DTS-STC)_{A2}=DTS_{A2}-STC_{A2}$
Then the following equations are true:

$$DTS_{N1}-STC_{N1}=DTS_{N2}-STC_{N2} \quad (3)$$

$$DTS_{A1}-STC_{A1}=DTS_{A2}-STC_{A2} \quad (4)$$

Or:

$$STC_{N2}-STC_{N1}=DTS_{N2}-DTS_{N1} \quad (5)$$

$$STC_{A2}-STC_{A1}=DTS_{A2}-DTS_{A1} \quad (6)$$

According to ITU-T Recommendation H.222|ISO/IEC 13818-1 (2000): "Information Technology—Generic Coding of moving pictures and associated audio information: Systems" and ITU-T Recommendation H.262|ISO/IEC 13818-2 (2000): "Information Technology—Generic Coding of moving pictures and associated audio information: Video" the difference between two consecutive DTS values is equal to the frame period (inverse of the frame rate) expressed in 90 kHz ticks:

$$DTS_{N2}-DTS_{N1}=n_N \times T_{fN} \times 90000 \quad (7)$$

$$DTS_{A2}-DTS_{A1}=n_A \times T_{fA} \times 90000 \quad (8)$$

With:
$n_N$=number of frames in avail
$n_A$=number of frames in ad
$T_{fN}$=frame period of network feed
$T_{fA}$=frame period of ad
If the number of frames in ad and avail are equal and their frame periods are equal then:

$$DTS_{N2}-DTS_{N1}=DTS_{A2}-DTS_{A1} \quad (9)$$

From (5), (6) and (9) the following equation can be derived:

$$STC_{N2}-STC_{N1}=STC_{A2}-STC_{A1} \quad (10)$$

The transmission duration of a Transport Stream can be derived from the STC time as:

$$T_{TR}=(STC_{end}-STC_{start})/\text{system\_clock\_frequency} \quad (11)$$

With:
$T_{TR}$=transmission duration of a Transport Stream
$STC_{end}$=value of the system time clock at the end of the TS
$STC_{start}$=value of the system time clock at the start of the TS
System_clock_frequency=frequency of the 27.0 MHz reference clock used to generate the STC.
If we apply (11) to both the network feed and the ad following equations are obtained:

$$T_{TR,N}=(STC_{N2}-STC_{N1})/\text{system\_clock\_frequency}_N \quad (12)$$

$$T_{TR,A}=(STC_{A2}-STC_{A1})/\text{system\_clock\_frequency}_A \quad (13)$$

With:
$T_{TR,N}$=transmission duration of the avail
$T_{TR,A}$=transmission duration of the ad
System_clock_frequency$_N$=27.0 MHz reference clock of the network feed
System_clock_frequency$_A$=27.0 MHz reference clock of the ad
If:

$$\text{System\_clock\_frequency}_N=\text{system\_clock\_frequency}_A \quad (14)$$

Then:

$$T_{TR,N}=T_{TR,A} \quad (15)$$

In other words, if the decoder buffer pre-conditioning, as described below, is perfectly met and the system_clock_frequency of ad and network feed is equal, then the transmission duration of network feed avail and ad are equal, which means that the ad fits perfectly in the avail.

One can also see that if system_clock_frequency$_A$>system_clock_frequency$_N$, the transmission duration of the ad is less than the avail duration. If system_clock_frequency$_A$<system_clock_frequency$_N$, the transmission duration of the ad is larger than the avail duration.

In reality however, it is impossible to meet requirement (14) since the network feed is coming from an encoder while the ad is coming from an ad server (unless, of course, their reference clocks are locked to a common reference). Therefore, a method is implemented in splicer 120 to synchronize the system_clock_frequency of the ad with that of the network feed.

At the start of the ad (i.e., the first picture), splicer 120 determines the STC offset between the ad and the network feed. For each consecutive ad picture, the STC offset is determined again. If there is a difference in STC offset, this difference is taken into account in the delay the ad picture will experience through the splicer. This is repeated until the end of the ad is reached.

The actual result that is obtained with this methodology is that the ad will be played out by splicer 120 at a slightly faster or slower rate than the original rate coming out of the ad server 125. This is illustrated in FIG. 8 for the case where system_clock_frequency$_A$<system_clock_frequency$_N$.

Figure 8:
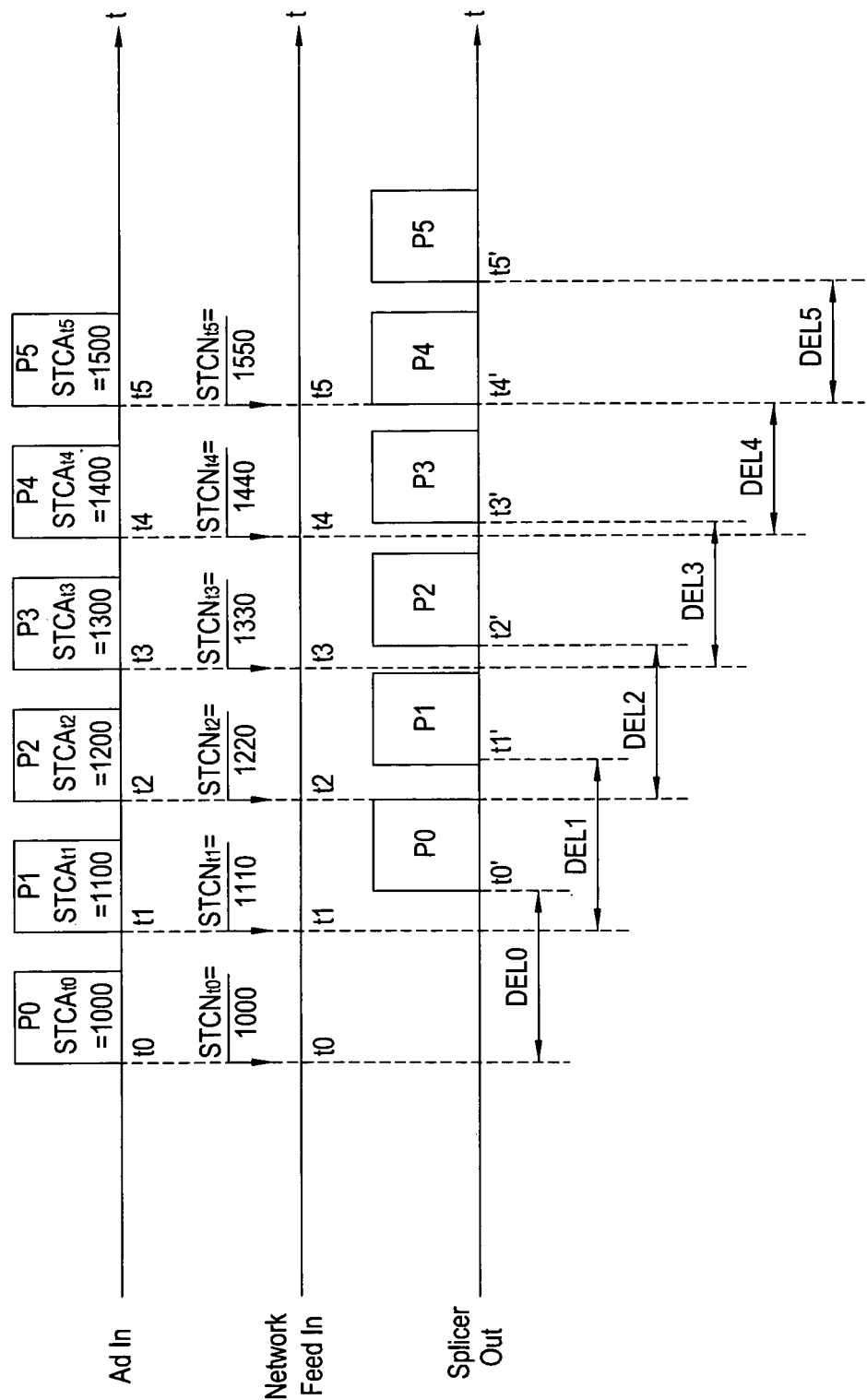
FIG. 8 shows a case where the system clock frequency of an ad is less than the system clock frequency of the network feed in accordance with an embodiment of the present invention.

One can see from FIG. 8 that in this case the input to output delay for the ad pictures decreases for each consecutive picture. The net effect is that the ad is played out by splicer 120 at a rate that is slightly higher than the original rate played out by the ad server. This allows splicer 120 to fit the ad into the avail window.

In FIG. 8, $$DEL0 = DEL_{CONST}$$

$$DEL1 = DEL_{CONST} + [(STCN_{t0} - STCA_{t0}) - (STCN_{t1} - STCA_{t1})] = DEL_{CONST} + STC_{COR}(t1)$$

$$DEL2 = DEL_{CONST} + [(STCN_{t0} - STCA_{t0}) - (STCN_{t2} - STCA_{t2})] = DEL_{CONST} + STC_{COR}(t2)$$

$$DEL3 = DEL_{CONST} + [(STCN_{t0} - STCA_{t0}) - (STCN_{t3} - STCA_{t3})] = DEL_{CONST} + STC_{COR}(t3)$$

$$DEL4 = DEL_{CONST} + [(STCN_{t0} - STCA_{t0}) - (STCN_{t4} - STCA_{t4})] = DEL_{CONST} + STC_{COR}(t4)$$

$$DEL5 = DEL_{CONST} + [(STCN_{t0} - STCA_{t0}) - (STCN_{t5} - STCA_{t5})] = DEL_{CONST} + STC_{COR}(t5)$$

1.3 Ad Delay Offset Calculation

The strategy that is preferably used for the delay of the network feed through splicer 120 is that the network feed will always experience a fixed delay (e.g., 1 second). This guarantees that the decoder buffer level of the network feed at the output of splicer 120 will always be identical to the original decoder buffer level of the same feed at the input of splicer 120, even if the pre-conditioning of network feed and/or ad were incorrect and the splice has failed. In other words, if the incoming video network feed is standard compliant, the output feed will be compliant. If the incoming feed is non-compliant, the output will be non-compliant. Note that this also applies to the ad if abstraction is made of the timebase correction described above.

When an ad is to be inserted, the ad server 125 starts playing out the ad a certain time before the actual splice point. This time can differ from ad server to ad server (normally this is a customizable setting). When splicer 120 has to switch between the network feed and the ad, it has to calculate the delay it must apply to the first frame of the ad. This delay is a function of the relative delay between network feed and ad.

The initial delay of the first ad frame that is to be inserted into the network feed is calculated by subtracting the arrival time of the first packet of the first frame of the ad from the arrival time of the first packet of the first frame of the network feed that is replaced by the ad.

Figure 9:
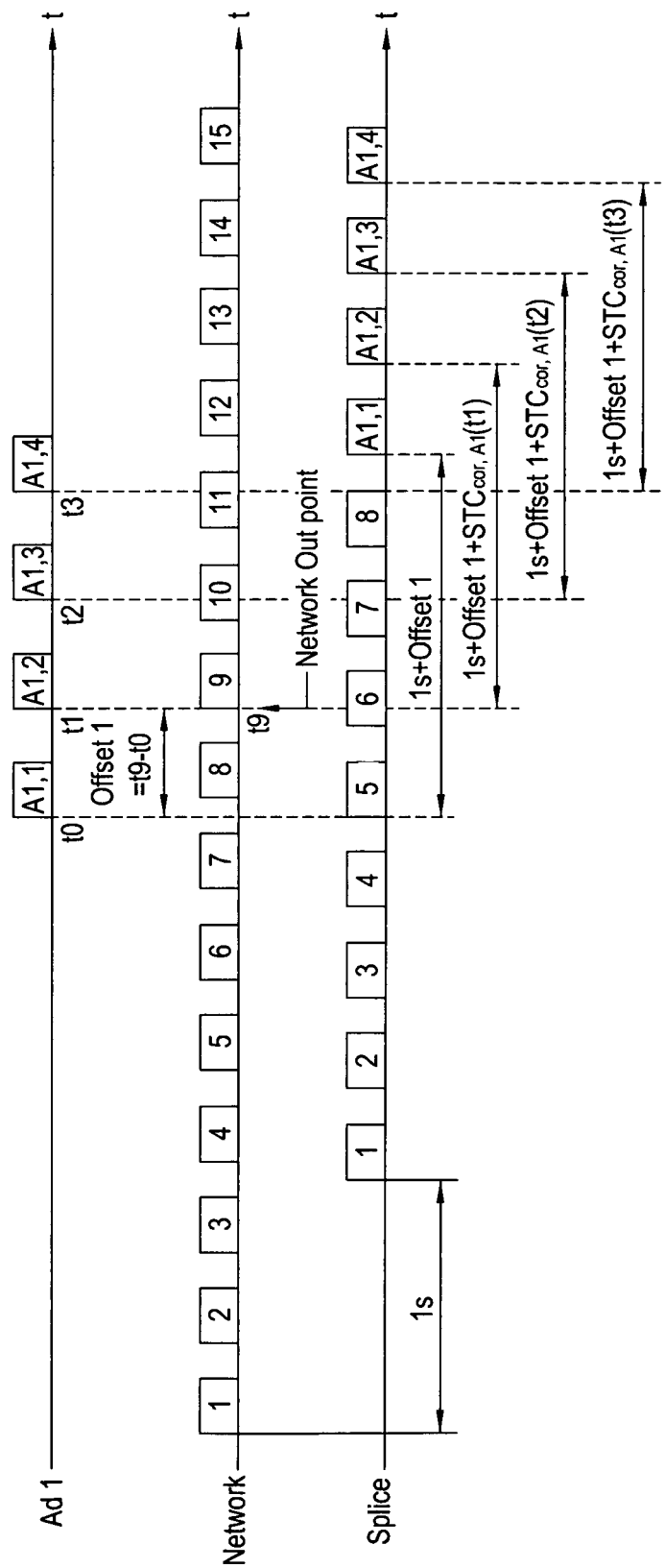
FIGS. 9-11 depict delay offsets between an ad and a network feed in accordance with embodiments of the present invention.

This is illustrated in FIG. 9 in which, for ease of illustration, all blocks represent 1 picture and 1 TS packet. In this example, the network feed experiences a fixed delay of 1 second. As shown, the first frame of the ad arrives in splicer 120 at time $t_0$. The frame of the network feed that corresponds with the network out point arrives in splicer 120 at time $t_9$. The delay offset between the ad and the network feed is obtained by subtracting $t_0$ from $t_9$ (Offset1=$t_9$−$t_0$). The total delay of the first frame of the ad is then given by adding the Offset1 value to the 1s fixed delay of the network feed.

For all subsequent frames of the ad, this delay is re-used but for each frame there is an additional delay correction value to compensate for the time base difference between network feed and ad, as explained in section 1.2.

Figure 10:
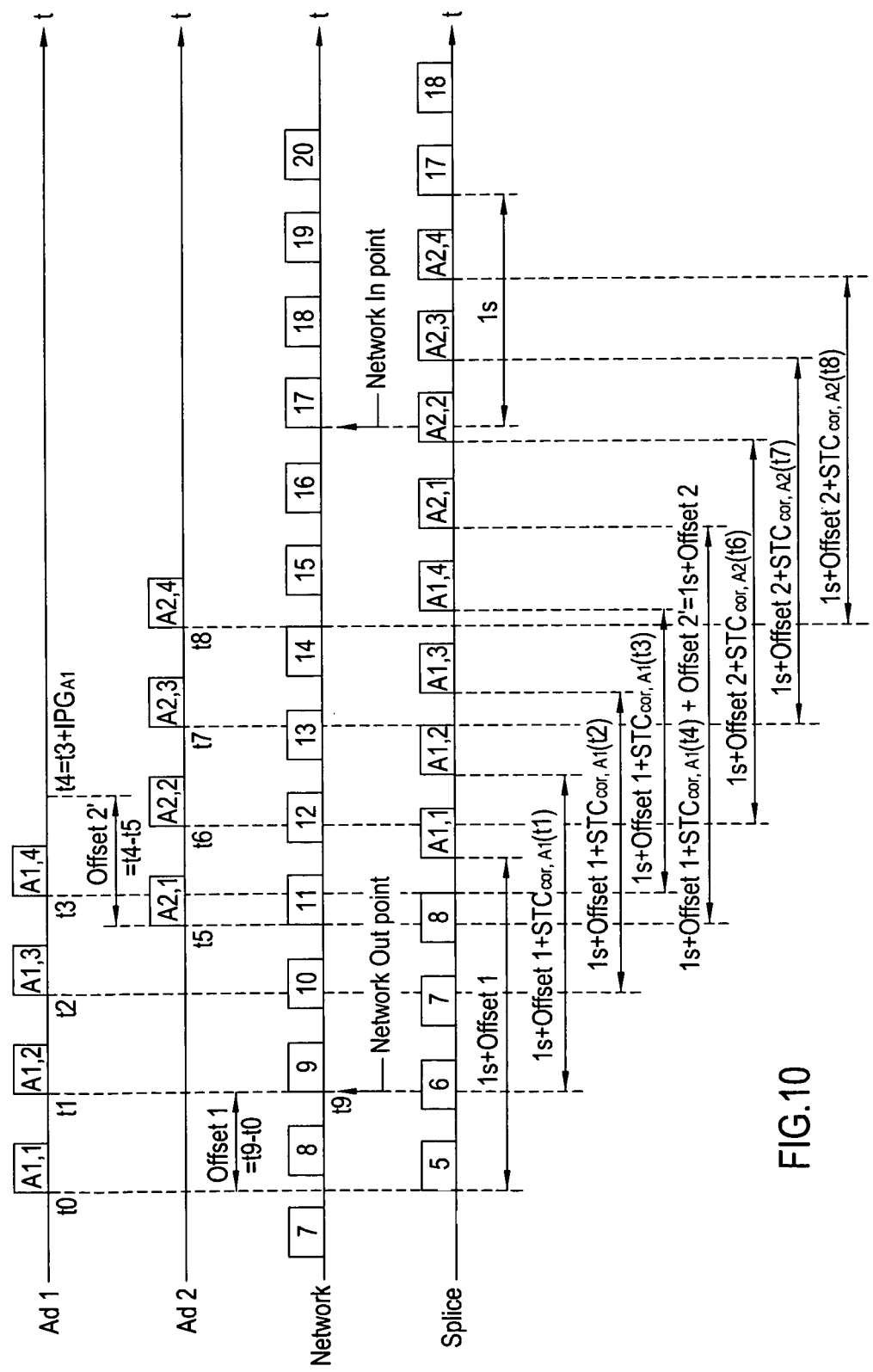

The delay offset calculation for a back-to-back splice is illustrated in the FIG. 10. First, the delay offset between the first frame of ad2 and the end of ad1 is determined. For this calculation, the first problem pops up. The arrival time of the end of the first ad is not known. Actually one could see this as the arrival time of a virtual frame that comes right after the last frame of ad1. The arrival time can be estimated by adding the inter packet gap of ad1 (IPG$_{A1}$) to the arrival time of the last packet of the last frame of ad1. IPG$_{A1}$ can be calculated in many different ways, e.g., the average IPG over the full ad, the minimum IPG over the full ad, and so on. Once that $t_4$ is determined, the delay offset between ad1 and ad2 is calculated as Offset 2'=$t_4$−$t_5$.

The actual delay offset of ad2 is then calculated by adding Offset 2' to the delay of the virtual picture of ad1 that arrives at time $t_4$. The latter has a delay offset equal to 1s+Offset 1+STC$_{COR,A1}$($t_4$).

This means that the total delay offset of the first picture of ad2 is equal to 1s+Offset 1+STC$_{COR,A1}$($t_4$)+Offset 2'. If we replace Offset 1+STC$_{COR,A1}$($t_4$)+Offset 2' by Offset 2 then the delay offset of the first picture of ad2 is given by 1s+Offset 2.

For all subsequent frames of ad2, this delay is re-used but for each frame there is an additional delay correction value to compensate for the time base difference between network feed and ad2. One can also see in FIG. 10 that at the end of ad2 the network feed goes back into the output with a delay of 1s. If all decoder buffer pre-conditioning is done properly, all ads should fit perfectly into the avail of the network feed.

Figure 11:
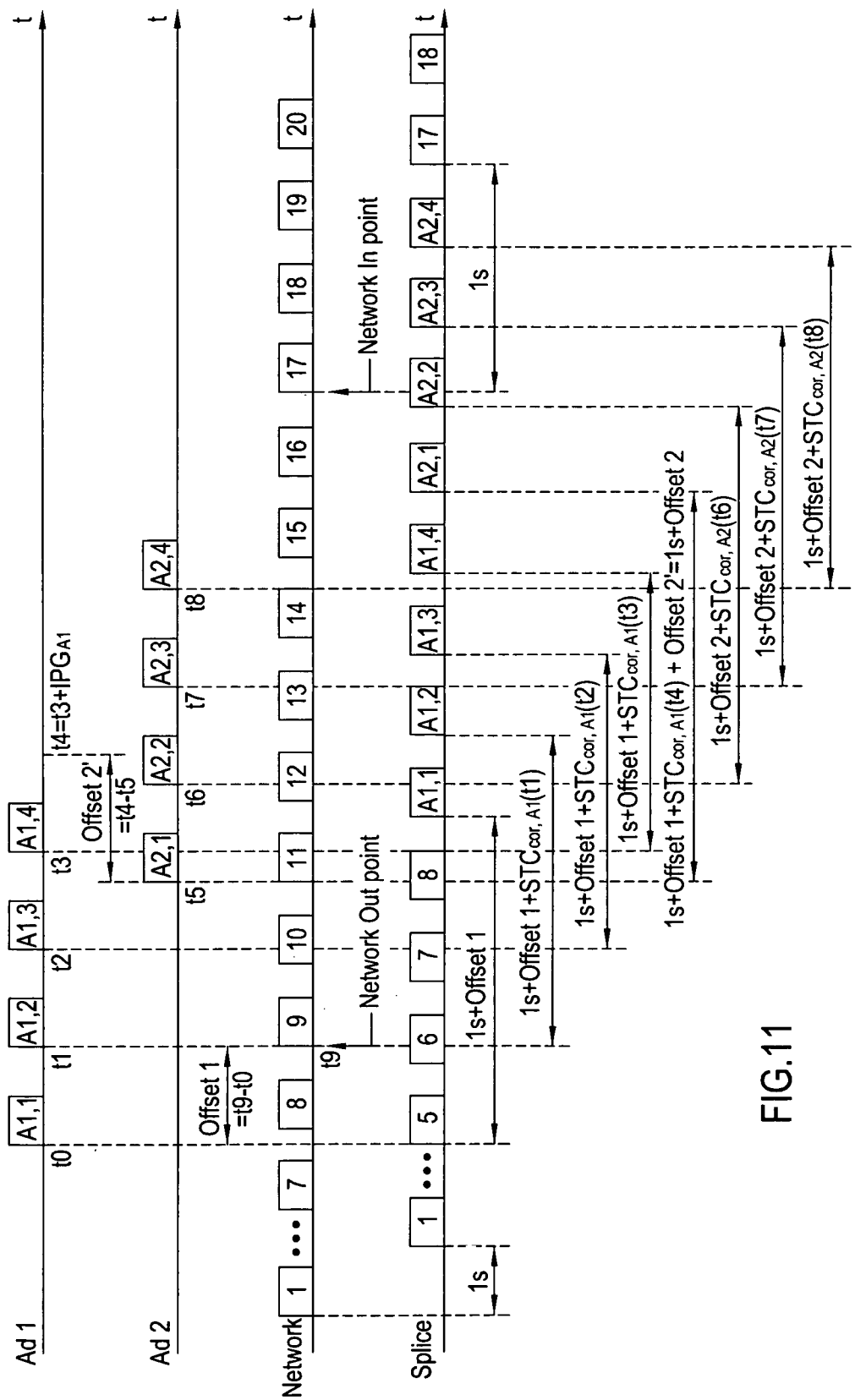

The complete overview for a back-to-back ad insertion operation is depicted in FIG. 11.

Splicer 120 delays each audio TS packet with a fixed amount of time, just like for video. In principle, this total delay is fixed between splice points. Just like for video, the delay can compensate for the small difference in frequency between network feed STC and ad STC.

1.4 Ad DTS/PTS Offset Calculation

Since in general the DTS/PTS values of the video stream in network feed and ad are in no means related to each other, the DTS/PTS values of the ad will need a correction to guarantee continuity. The DTS/PTS offset value at the network out point is given by:

$$DTS\_PTS\_Offset = DTS_{N,Last} + T_f \times 90,000 - DTS_{A,First} \quad (16)$$

With:

DTS$_{N,Last}$=DTS value of the last picture of the network feed that is decoded before the splice.

$T_f$=frame period of network feed and ad (s).

DTS$_{A,First}$=DTS value of the first decoded picture of the ad.

This DTS_Offset value will be used to update the DTS values of the first ad according to following formula:

$$DTS_{NEW,A} = DTS_A + DTS\_PTS\_Offset \quad (17)$$

With:

DTS$_{NEW,A}$=updated DTS value of the ad.

DTS$_A$=original DTS value of the ad.

The DTS_Offset value will also be used to update the PTS values of the first ad according to following formula:

$$PTS_{NEW,A} = PTS_A + DTS\_PTS\_Offset \quad (18)$$

With:
$PTS_{NEW,A}$=updated PTS value of the ad.
$PTS_A$=original PTS value of the ad.

For back-to-back splices, a DTS_PTS_Offset value must be determined for each ad. The DTS/PTS offset value for a back-to-back ad is given by:

$$DTS\_PTS\_Offset_{n+1} = DTS_{NEW,An,Last} + T_f \times 90{,}000 - DTS_{An+1,First} \quad (19)$$

With:
DTS_PTS_Offset$_{n+1}$=DTS/PTS offset value for ad n+1
$DTS_{NEW,An,Last}$=Updated DTS value of the last picture of ad n
$T_f$=frame period of the ad (s).
$DTS_{An+1,First}$=DTS value of the first picture of ad n+1.

The DTS and PTS values for each ad will be updated according to formulas (17) and (18).

Note that for the network video feed, the DTS_PTS_Offset value is always 0.

The audio stream in the splicer output must have continuous PTS's, just like video. The PTS's of an ad have to be updated with an offset equal to the difference between the PTS of the first audio frame of the ad and the first network audio frame that is replaced by the ad. This offset is not the same offset as the DTS/PTS offset of video, because of the difference in frame duration between video and audio. Just like in video, the PTS offset is again zero when splicing back to the network feed.

The difference between DTS/PTS offset of video and the PTS offset in audio is a lip-sync error, which is not noticeable if it is sufficiently fine, typically less than the duration of an audio frame. If both offsets are again zero after splicing back to the network feed, there is no accumulation of lip-sync errors.

2. Program Switching with Pre-Conditioning 2.1 General Concept

Figure 12:
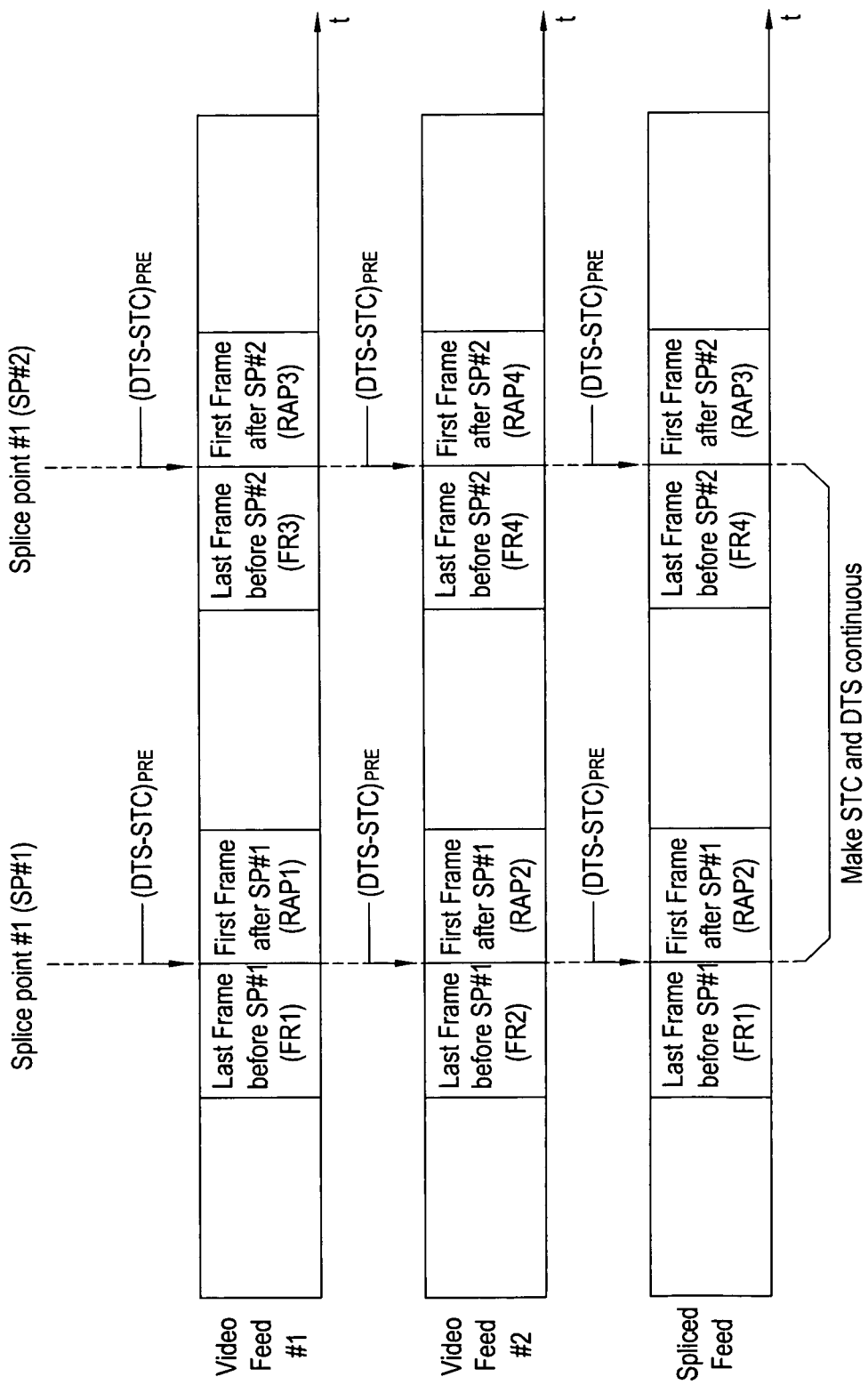
FIG. 12 depicts video pre-conditioning when switching from video feed #1 to video feed #2 and back, in accordance with an embodiment of the present invention.

FIG. 12 depicts the video pre-conditioning when switching from video feed #1 to video feed #2 (SP#1) and back (SP#2) and the resulting format of the spliced feed. Note that in this Figure abstraction is made of possible delays between the two video feeds and the spliced feed, which must be handled by the splicer.

Before the first splice event occurs (SP#1 in FIG. 12), the spliced video feed contains all frames of video feed #1. The last frame of video feed #1 that is included in the spliced feed before the actual splicing starts is indicated in FIG. 12 as FR1.

At SP#1, the pre-conditioning encoder of video feed #1 generates a Random Access Point (RAP) frame, indicated in FIG. 12 as RAP1, with a pre-conditioned DTS-STC value indicated as $(DTS-STC)_{PRE}$. At the same instance of time, the pre-conditioning encoder of video feed #2 also generates a closed GOP that starts with a Random Access Point (RAP) frame, indicated in FIG. 12 as RAP2, with a pre-conditioned DTS-STC value indicated as $(DTS-STC)_{PRE}$.

At SP#1, the splicer switches from video feed #1 to video feed #2. The first frame in the spliced feed after SP#1 is RAP2 of video feed #2. From that point onwards, all subsequent video frames of video feed #2 are included in the spliced feed up till the second splice event (SP#2).

At SP#2, the pre-conditioning encoder of video feed #1 generates a closed GOP that starts with a Random Access Point (RAP) frame, indicated in FIG. 12 as RAP3, with a pre-conditioned DTS-STC value indicated as $(DTS-STC)_{PRE}$. At the same instance of time, the pre-conditioning encoder of video feed #2 also generates a closed GOP that starts with a Random Access Point (RAP) frame, indicated in FIG. 12 as RAP4, with a pre-conditioned DTS-STC value indicated as $(DTS-STC)_{PRE}$.

The last video frame in the spliced feed right before SP#2 is frame FR4 of video feed #2. The first frame in the spliced feed right after SP#2 is Random Access Point frame RAP3 of video feed #1. From that point onwards, the spliced feed contains all subsequent frames from video feed #1, until the next splice point.

Audio frames do not have the same duration as video frames. As a consequence, splice points in video and audio do not coincide exactly. Therefore, audio is spliced at an audio frame boundary near the video splice point. After a splice, the audio is shifted slightly in time with respect to video, because there is no audio gap in the spliced output.

Figure 13A:
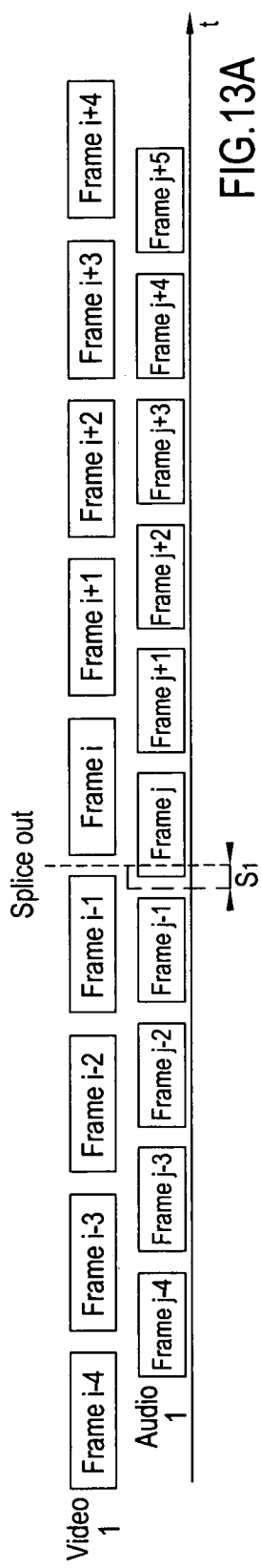
FIGS. 13A-C depict lip sync error introduced by splicing.
Figure 13B:
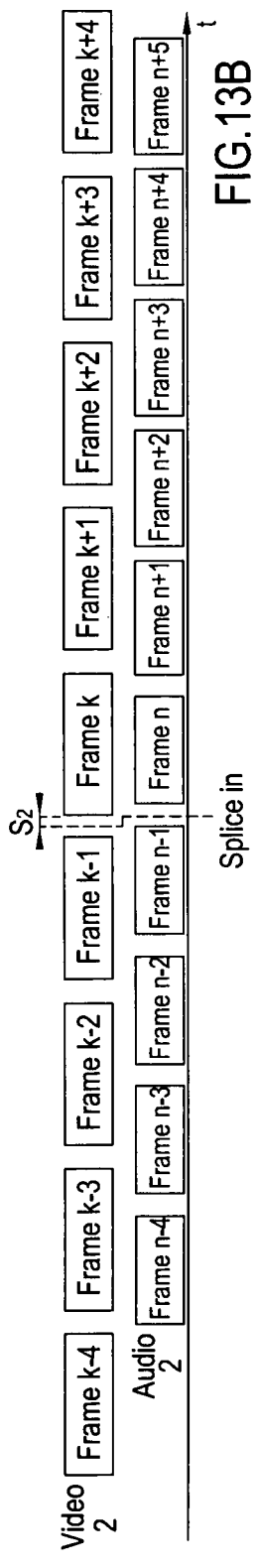
Figure 13C:
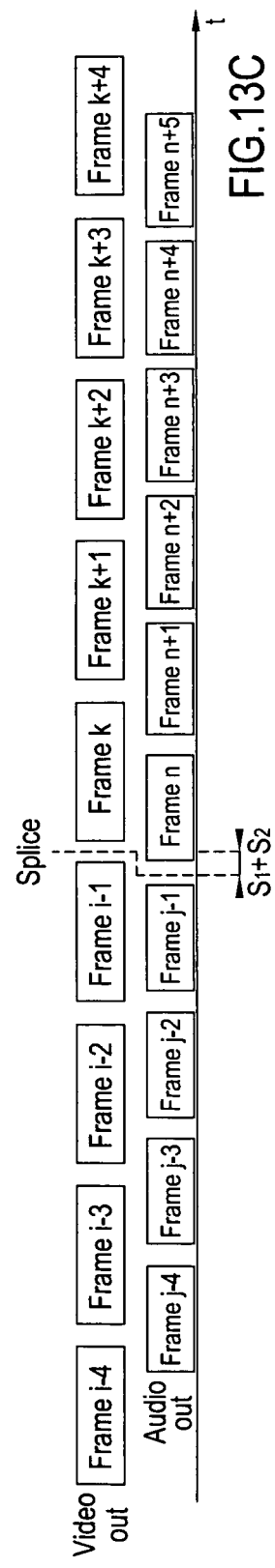

This is illustrated in FIGS. 13A-C. FIG. 13A shows a feed for Video 1 and Audio 1. FIG. 13B shows a feed for Video 2 and Audio 2. As shown in the video out of FIG. 13C, the video splice occurs immediately after Frame i-1 of the Video 1 feed, and begins with Frame k of the Video 2 feed. The Audio out is spliced at Frame j-1 of the Audio 1 feed and Frame n of the Audio 2 feed. $S_1$ and $S_2$ represent the shift of the audio frames with respect to their respective video frames. Although this shift is minimized due to the creation of multiple audio frames near the splice point, some amount of "lip sync error" is nevertheless introduced at the splice point. In particular, audio frame n is shifted $S_1+S_2$ with respect to video frame k. The shift of $S_1+S_2$ is the total lip sync error that is introduced by the splice.

This shift can lead to noticeable lip sync problems, especially due to accumulation of the shift after a number of splices or program switches. A splicer can compensate for the previously accumulated shift by taking an alternative audio frame boundary as splice point. In case of a positive accumulation, the splice can cut off the head audio stream one frame earlier or the tail audio stream one frame later (opposite actions would be taken for negative accumulation of shift).

Audio frames are packed in PES packets just like video. It is common practice that a number of audio frames are packed together in one PES packet because of bandwidth efficiency. Therefore, the ideal audio splice point can be in the middle of a given PES packet. If the audio content is not in the clear, it is impossible to splice at the ideal audio splice point, since this involves de-packing the audio frames and re-packing some of them in a new PES packet. This problem can be solved by forcing the audio encoder to pre-condition the packetization near splice points, forcing PES packets with a single audio frame, as illustrated in FIG. 4.

When switching from video feed #1 to video feed #2, the PCR timebase of the spliced output is also switched from that of video feed #1 to video feed #2. When switching from video feed #2 back to video feed #1, the STC timebase of the spliced output is also switched from that of video feed #2 to video feed #1. During the insertion of video feed #2 in the spliced output, the PTS, DTS and STC values are modified by the splicer 120 in such a way that there are no discontinuities in the PTS, DTS and STC values. Although the DTS-STC values are pre-conditioned (i.e., the difference between DTS and STC) there will in general be an offset between DTS and STC values of video feed #1 and video feed #2.

Because of the DTS-STC pre-conditioning at the splice points, the decoder buffer level of the spliced feed will be compliant with the applicable decoder buffer model.

Note that in case of program switching, timebases are switched and therefore there is no need for time base correction (see 1.2).

2.2 Delay Offset Calculation

The strategy that is preferably used for the delay of the video streams through splicer 120 is that the video streams will always experience a fixed delay. This guarantees that the decoder buffer level of the video streams at the output of splicer 120 will always be identical to the original decoder buffer level of the same stream at the input of splicer 120. In other words, if the incoming video feed is standard compliant, the output feed will be compliant. If the incoming feed is non-compliant, the output will be non-compliant.

When two video feeds are to be spliced, there will in general be a time difference between the pre-conditioned splice points of both video feeds. When splicer 120 has to switch e.g. from video feed #1 to video feed #2, it has to calculate the delay it must apply to the first frame of the video feed #1. This delay is a function of the relative delay between the pre-conditioned splice points of both video feeds. Note that this calculation is similar to what is described in section 1.3 for ad insertion (without the timebase correction part). Once this delay is determined, it is applied to all subsequent frames of video feed #2. The same reasoning applies when switching from video feed #2 to video feed #1.

2.3 DTS/PTS and PCR Offset Calculation

Since in general the DTS/PTS values of video feed #1 and video feed #2 are in no means related to each other, the DTS/PTS values of the video feed at the output of the splicer will need a correction to guarantee continuity. The calculation of the DTS/PTS offset value is similar to what is described in 1.4 for ad insertion.

In general the timebases of video feed #1 and video feed #2 are in no means related to each other. Since in case of program switching the timebase is also switched the PCR fields at the output of splicer 120 will also need a correction to guarantee continuity. This correction value is called the PCR Offset value and is equal to the DTS/PTS Offset value (making abstraction of the difference in precision).

Note that when the splicer has switched from video feed #1 to video feed #2 and then switches back to video feed #1, the DTS_PTS_Offset and PCR_Offset values will in general be non-zero (was always zero for the network feed in case of ad insertion).

3. Decoder Buffer Pre-Conditioning

As noted above, decoder buffer pre-conditioning is needed when the splicer 120 inserts ads or a second feed into the network feed. Pre-conditioning is needed, in accordance with the present invention, when the splicer does not perform transrating, which is possible only when the transport stream is received in the clear, i.e., unencrypted.

In accordance with the principles of the present invention, decoder buffer pre-conditioning avoids decoder buffer overflow/underflow by adding a number of constraints to both the network feed and the ad in case of ad insertion or to both video feeds in case of program switching. These constraints are discussed hereinafter.

The constraints that are placed on both the network feed and the ad or on the two video feeds are expressed in (DTS−STC) values or Decoder Buffer delay values. A short explanation on these acronyms is given below.

3.1 STC/PTS/DTS/DTS−STC

The System Time Clock (STC) is defined in ITU-T Recommendation H.222|ISO/IEC 13818-1 (2000): "Information Technology—Generic Coding of moving pictures and associated audio information: Systems". The STC is actually a time reference (27 MHz clock) that is common to both the compressed video encoder and decoder.

The STC is used to create timestamps that indicate the correct presentation and decoding timing of audio and video, as well as to create timestamps that indicate the instantaneous values of the system clock itself at sampled intervals.

The timestamps that indicate the presentation time of audio and video are called Presentation Time Stamps (PTS). Those that indicate the decoding time are called Decoding Time Stamps (DTS). Finally, those that indicate the value of the system clock are called Program Clock Reference (PCR). The STC is reconstructed in the decoder by interpolation of the PCR values by means of a PLL.

Figure 14:
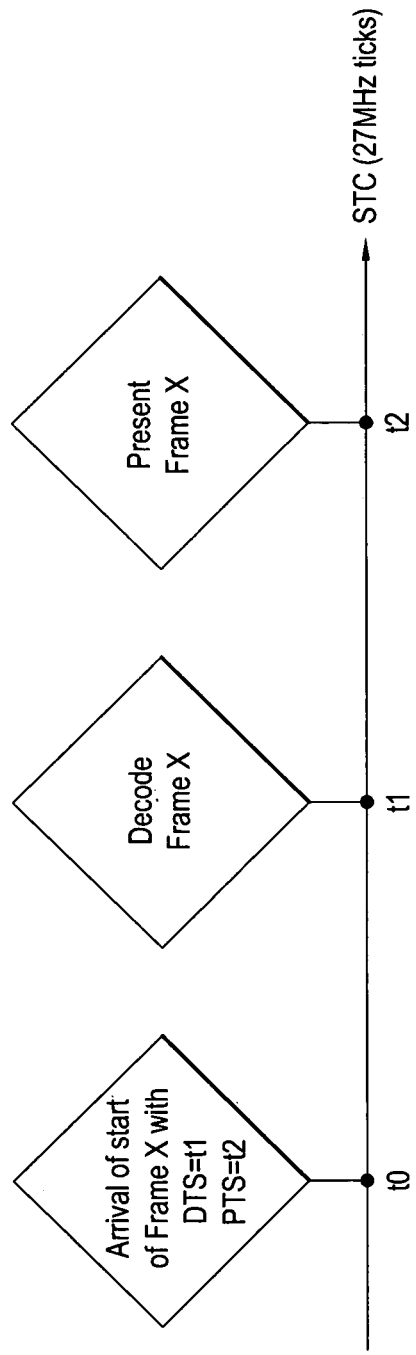
FIG. 14 shows decoding and presentation timing

To put it in others words, the STC is the time reference that is available in both the encoder and the decoder. Certain decoder events such as decoding and presentation of a picture are dictated by timestamps that contain the value of the System Time Clock at which the event must occur. This is illustrated in FIG. 14.

Note that the System Time Clock and the PCR samples have an accuracy of 27 MHz (37 ns), while the accuracy of PTS and DTS fields is limited to 90 kHz (11 s).

The DTS−STC value that will be used herein is the delay between the arrival of the start of a frame in the decoder and the actual decoding of this frame. In the example above, DTS−STC of frame X is equal to t1−t0. DTS−STC is actually the time that the first bit of a frame stays in the decoder buffer before the frame is decoded (decoder buffer delay).

Note that the DTS−STC value defined above is more or less equal to the vbv_delay in MPEG-2 video or the cpb_delay in H.264.

Figure 15:
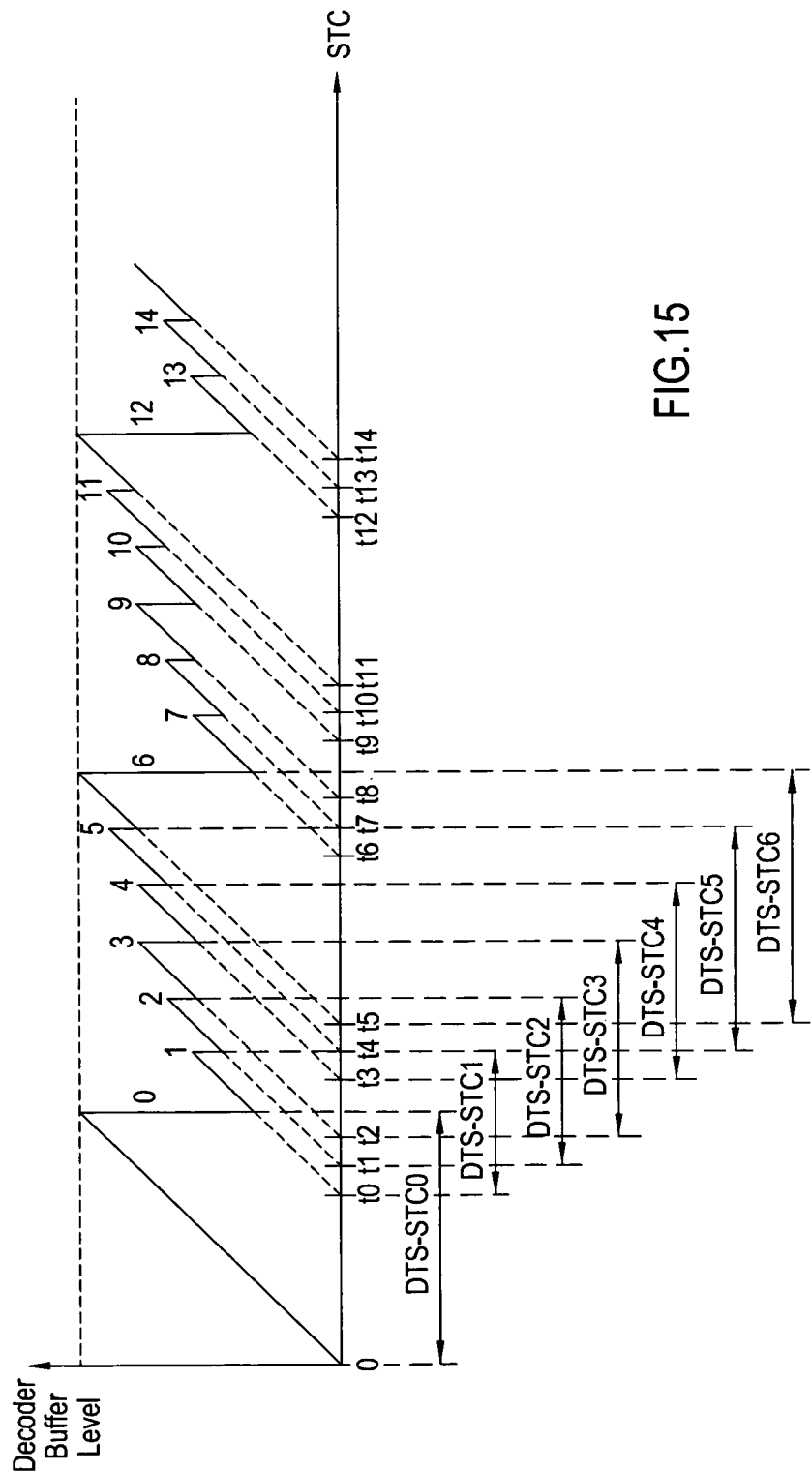
FIG. 15 shows an example of the level of a compressed video decoder buffer varying over time.

For a constant bit-rate (CBR) video stream, the DTS−STC value can be easily derived from the decoder buffer level, as shown in FIG. 15. FIG. 15 shows an example of the level of a compressed video decoder buffer varying over time. At time 0, the start of picture 0 arrives in the decoder. At time t0, picture 0 has completely arrived in the decoder buffer. This means that the start of picture 1 arrives in the decoder right after t0. At time t1, picture 1 has completely arrived in the decoder buffer, and so on.

For a CBR video stream, the buffer level right before removal (decoding) of a picture is given by:

$$\text{Buffer\_level} = \text{Rate} \times (DTS-STC)$$

With:
Buffer_level=decoder buffer level right before a certain picture is decoded
Rate=constant bit-rate of the video feed
DTS−STC=decoding delay for that picture In other words, for a CBR video stream the decoder buffer level before removal of a picture is proportional to the DTS−STC value of that picture.

3.2 Decoder Buffer Pre-Conditioning for Ad Insertion

3.2.1 Decoder Buffer Pre-Conditioning Constraints

At least the first one of the following constraint is needed on the network feed to guarantee a seamless splice.

1. (DTS−STC) value is equal at the Random Access Point (RAP) frames that are inserted by the pre-conditioning encoder at the splice points.
2. (DTS−STC) value of all frames between the RAP frames of the network feed is less than or equal to the (DTS−STC) value of the RAP frames The following constraints are needed on the ad to guarantee a seamless splice.

1. (DTS−STC) value is equal at the beginning and end of the ad.
2. (DTS−STC) value at the beginning and end of the ad is less than or equal to the (DTS−STC) value of the network feed at the splice points (i.e. of the RAP frames).

3. (DTS−STC) value of all frames between the beginning and end of the ad is less than or equal to the (DTS−STC) value at the beginning and the end of the ad.
4. Bit-rate of the ad is lower than or equal to the bit-rate of the network feed.

Figure 16:
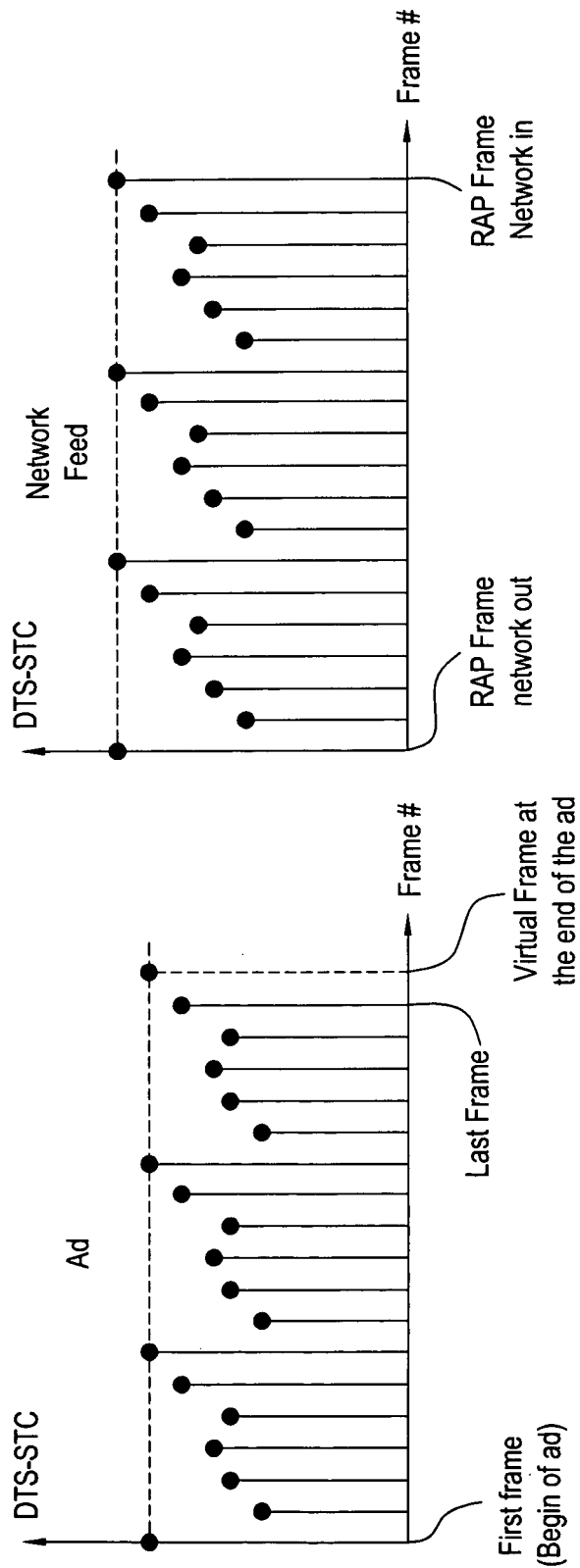
FIGS. 16A and 16B show an example of DTS–STC values for each frame of an ad and network feed that complies with constraints in accordance with an embodiment of the present invention.

Note that the DTS−STC value at the end of the ad is actually the DTS−STC value of a virtual frame that is appended to the end of the ad (this virtual frame is not part of the ad however). FIGS. 16A and 16B show an example of DTS−STC values for each frame of the ad and the network feed (avail only) that complies with the constraints stated above.

Note that a special case of decoder buffer pre-conditioning that fulfills the requirements for ad insertion stated above occurs when the DTS−STC value reaches a maximum at the splice points and this maximum is identical for both the network feed and the ad. This is one possible implementation of the pre-conditioning constraints for ad insertion.

3.2.2 Effect of Splicing on Decoder Buffer Delay

FIG. 7 depicts the decoder buffer pre-conditioning for both the network feed and the ad in case of ad insertion As shown, for the network feed:

DTS−STC right after the network out point is $(DTS-STC)_{N1}$
DTS−STC right after the network in point is $(DTS-STC)_{N2}$
And for the Ad:
DTS−STC of the first frame of the ad is $(DTS-STC)_{A1}$
DTS−STC right after the last frame of the ad is $(DTS-STC)_{A2}$ The ad is inserted into the network feed by gluing the start of the ad to the first part of the network feed and gluing the second part of the network feed to the end of the ad. This is done as follows.

The network feed is copied into the output (spliced feed) until right before the first packet of the frame that corresponds with the network out point. This means that the first packet that contains the start of the frame that corresponds to the network out point is the first packet that is not copied to the output. The rate of the network feed in the output is equal to the original rate of the network feed (packets experience a fixed delay from the input to output of the splicer).

From then on, the packets of the ad, starting with the first packet, are copied into the output. The rate of the ad in the output is equal to the original rate of the ad (packets experience a fixed delay from the input to output of the splicer). The PTS, DTS, PCR (STC) and continuity counter values are updated to make them continuous when going from network feed to ad.

At the end of the ad, the first packet of the first frame of the network feed that comes after the network in point and all following packets of the network feed are copied into the output. The PTS, DTS, PCR (STC) and continuity counter values are updated to make them continuous when going from ad to network feed.

The DTS−STC value of the network feed right after the network out point has value $(DTS-STC)_{N1}$. Although the first frame of the ad has a DTS−STC value equal to $(DTS-STC)_{A1}$, at the moment the ad is glued to the network feed, the first frame of the ad will have a DTS−STC value equal to that of the network feed (i.e. $(DTS-STC)_{N1}$).

The reason for this is simple. The DTS and STC (PCR) values of the first frame of the ad are updated when going from network feed to ad in order to make these values continuous. Since the original network feed had continuous DTS and STC (PCR) values, there is no other possibility of making the DTS/STC values of the first frame of the ad equal to those of the network feed (in this case $(DTS-STC)_{N1}$).

This means that at the network out point, the ad will experience a shift in decoder buffer delay equal to:

$$(DTS-STC)_{N1} - (DTS-STC)_{A1}$$

Because of the $2^{nd}$ constraint on the ad given above, this shift will always have a positive value (or 0), which means that the ad frames will be held in the decoder buffer for a longer time than originally intended. Note that all frames of the ad will experience the same shift. This will give rise to an increase in decoder buffer level. Because of ad constraints 3 and 4 there is no risk of buffer overflow, as will be explained later.

At the network in point, the first frame of the network feed after the network in point is glued to the end of the ad. Although this frame has a DTS−STC value equal to $(DTS-STC)_{N2}$, its value will be modified by the gluing operation into:

$$(DTS-STC)_{A2} + [(DTS-STC)_{N1} - (DTS-STC)_{A1}]$$

If $(DTS-STC)_{A2}$ is equal to $(DTS-STC)_{A1}$, as stated in ad constraint 1, the DTS−STC value at the network in point is reduced to:

$$(DTS-STC)_{N1}$$

The 1st constraint for the network feed requires that $(DTS-STC)_{N1}$ is equal to $(DTS-STC)_{N2}$. Therefore, the DTS−STC value at the network in point can finally be reduced to:

$$(DTS-STC)_{N2}$$

which is the original DTS−STC value of the network feed at the network in point. This means that after the insertion of the ad, the network feed does not experience any additional decoder buffer delay, which means that the buffer levels after the ad will be identical to those in the original network feed. If the decoder buffer model was OK for the original network feed then it will be OK after the ad insertion.

Figure 17:
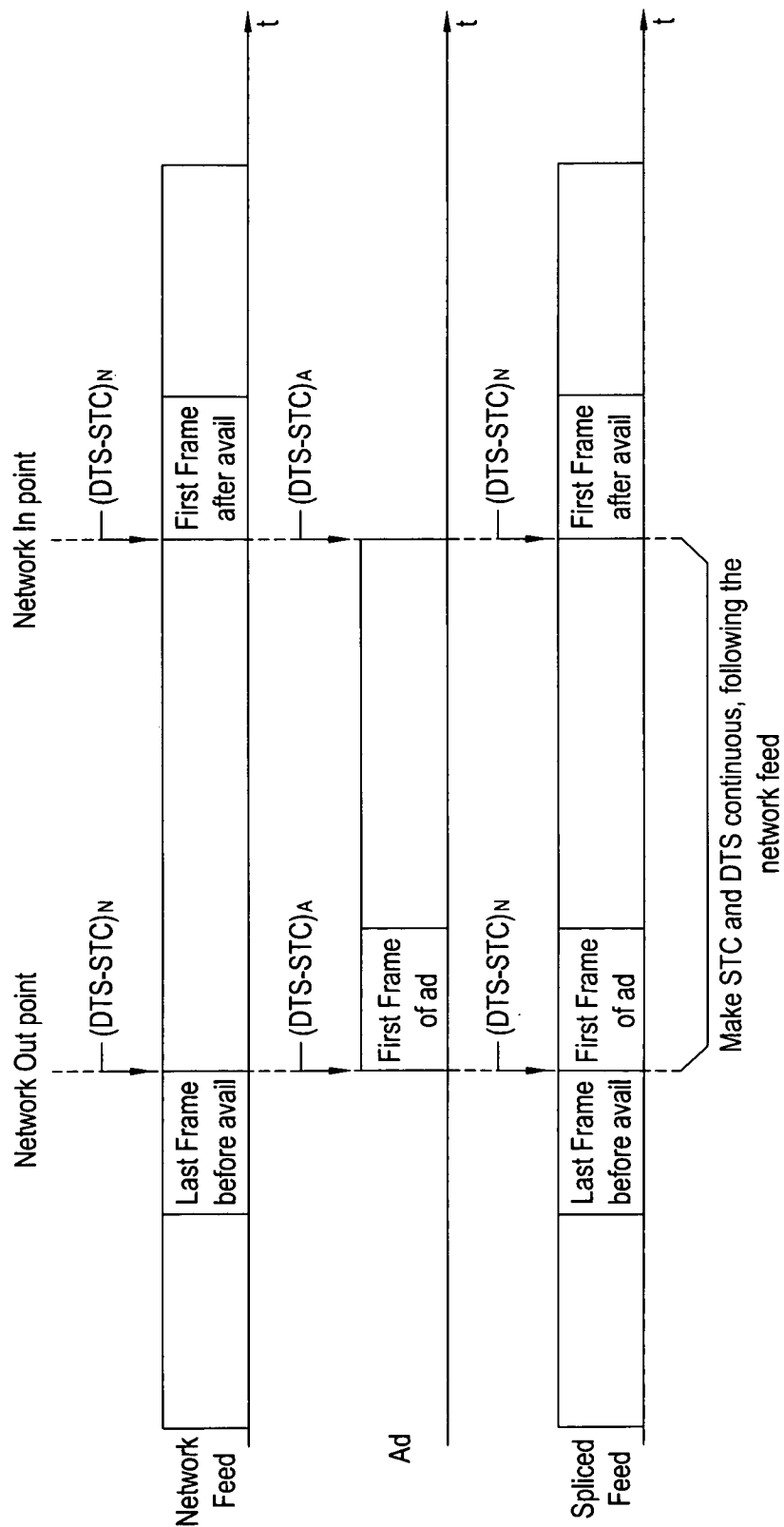
FIG. 17 shows a gluing operation in accordance with an embodiment of the present invention.

FIG. 17 shows an updated version of FIG. 7 after the ad insertion operation, taking the network and ad constraints into account

3.2.3 Effect of Splicing on the Decoder Buffer Level of the Ad

As explained in the previous paragraph, the gluing operation and the constraints on the ad and network feed will in general increase the DTS−STC value and decoder buffer level of the ad. The following explains why the decoder buffer does not underflow or overflow when this happens.

Remember that for CBR streams, the relation between (DTS−STC) and buffer level is given by following equation:

$$Buffer\_level = Rate \times (DTS-STC)$$

With:
Buffer_level=decoder buffer level right before a certain picture is decoded
Rate=constant bit-rate of the video feed
DTS−STC=decoding delay for that picture
If the rate of the network feed is equal to $Rate_N$ and the (DTS−STC) value of the network feed at the network out point is equal to $(DTS-STC)_N$ then the decoder buffer level of the original network feed at the network out point will be equal to:

$$Buffer\_level_N = Rate_N \times (DTS-STC)_N$$

If the original network feed complies with the decoder buffer model then this level must be lower than the maximum level.

The gluing operation will increase the (DTS–STC) value of the ad to be equal to that of the network feed at the network out point (see FIG. 17). Since the first frame of the ad had the maximum (DTS–STC) value in the original ad stream (because of ad constraint 1 and 3), it will also have the maximum (DTS–STC) value after the gluing operation since all frames in the ad experience the same increase in (DTS–STC) value.

If the rate of the ad is equal to $Rate_A$, the decoder buffer level right before the removal of the first frame of the ad will be equal to:

$$Buffer\_level_A = Rate_A \times (DTS-STC)_N$$

Note that this is the maximum buffer level that will be reached for the whole ad since the (DTS–STC) value of the ad reaches a maximum at the network out point.

Constraint 4 of the ad says that the rate of the ad ($Rate_A$) is always less than or equal to the rate of the network feed ($Rate_N$). Therefore $Buffer\_level_A$ must be less than or equal to $Buffer\_level_N$, which proves that there is no risk for decoder buffer overflow.

Since the gluing operation increases the buffer level for the ad, there is no risk for decoder buffer underflow either, since the decoder buffer level of the ad in the spliced feed is always higher than in the original ad.

If the (DTS–STC) value of the ad would be larger than that of the network feed (contrary to ad constraint 2), the (DTS–STC) value of the ad in the spliced feed would be decreased and the decoder buffer level of the ad would also decrease. This would mean that there is a risk for decoder buffer underflow, which explains why ad constraint 2 is needed.

Figure 22:
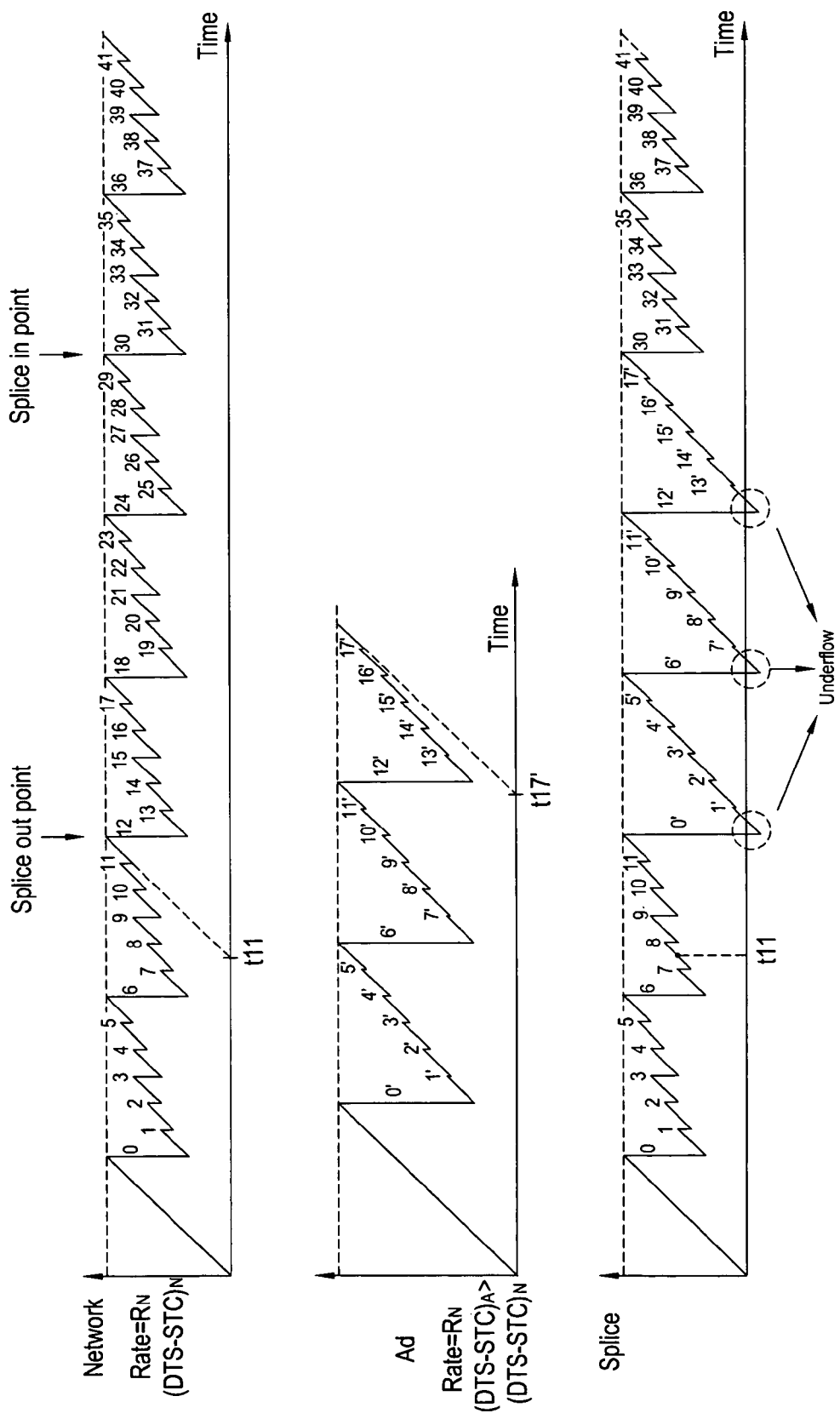
Figure 23:
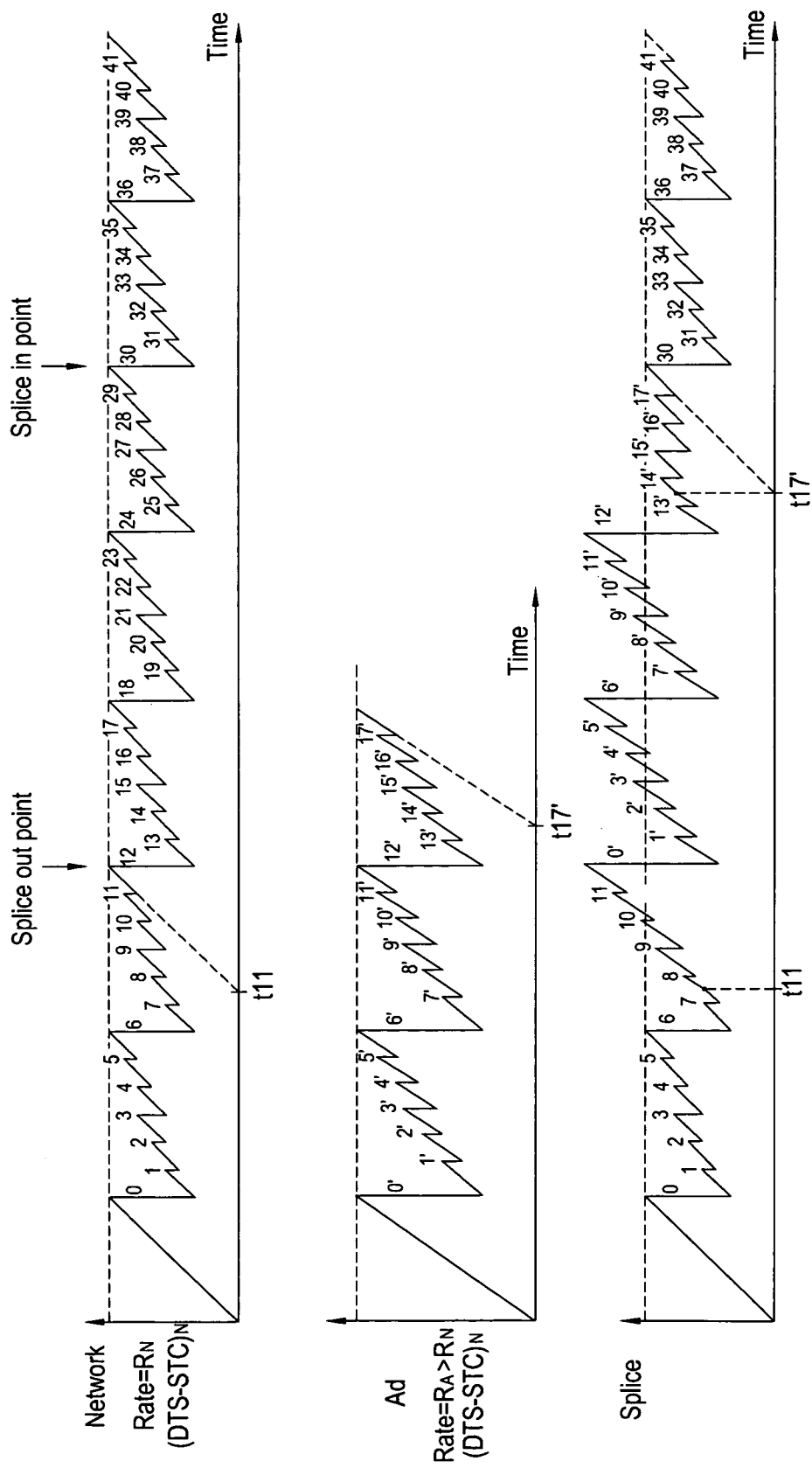
Figure 24:
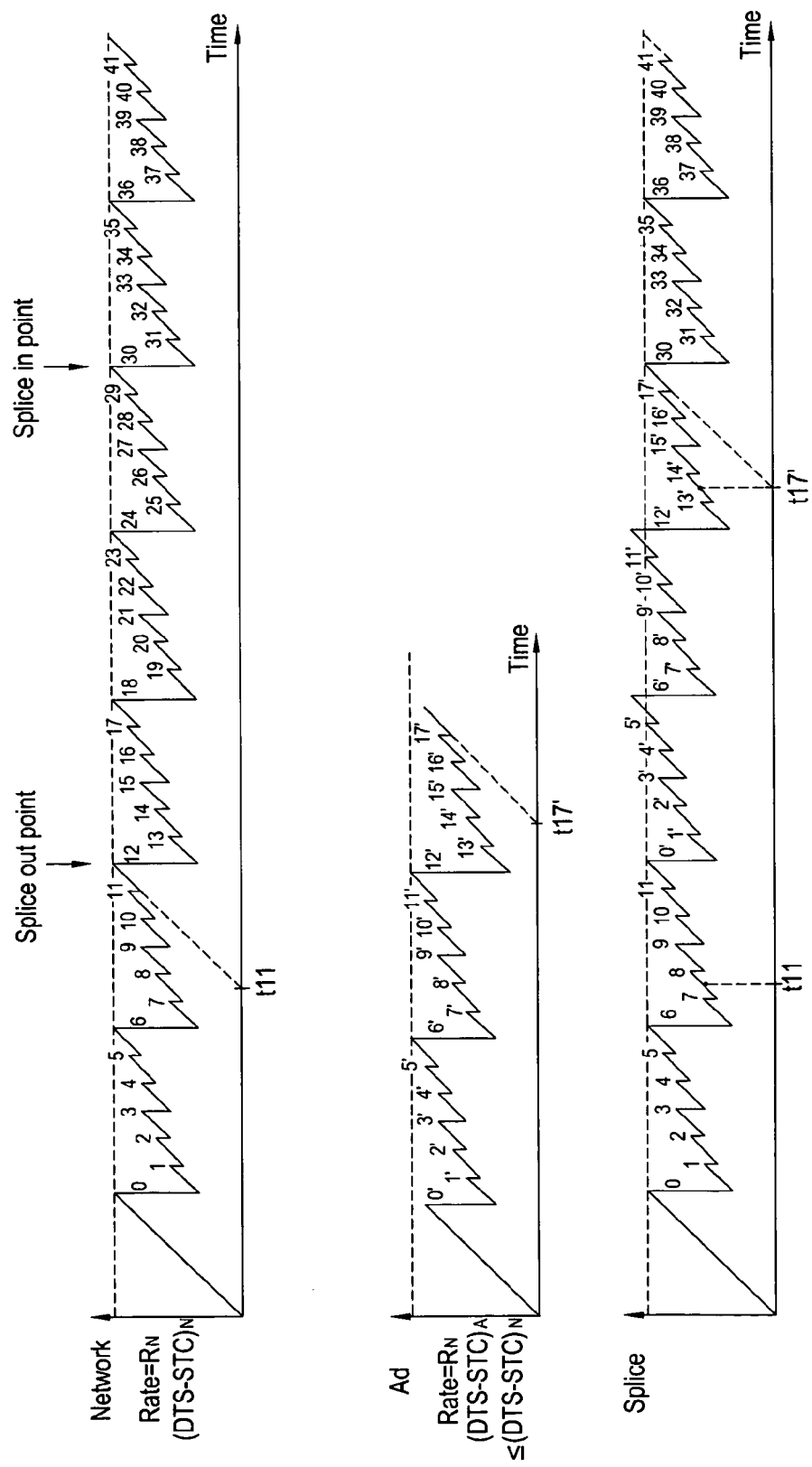

FIGS. 18-21 depict the decoder buffer model for all possible combinations of bit-rates and (DTS–STC) values of network feeds and ads that obey the pre-conditioning constraints:

$Rate_A < Rate_N$, $(DTS-STC)_A = (DTS-STC)_N$
$Rate_A = Rate_N$, $(DTS-STC)_A = (DTS-STC)_N$
$Rate_A = Rate_N$, $(DTS-STC)_A < (DTS-STC)_N$
$Rate_A < Rate_N$, $(DTS-STC)_A < (DTS-STC)_N$ Additional examples, shown in FIGS. 22-24 show the problems that can occur when not all constraints on network feed or ad are fulfilled.

EXAMPLE 1

Figure 18:
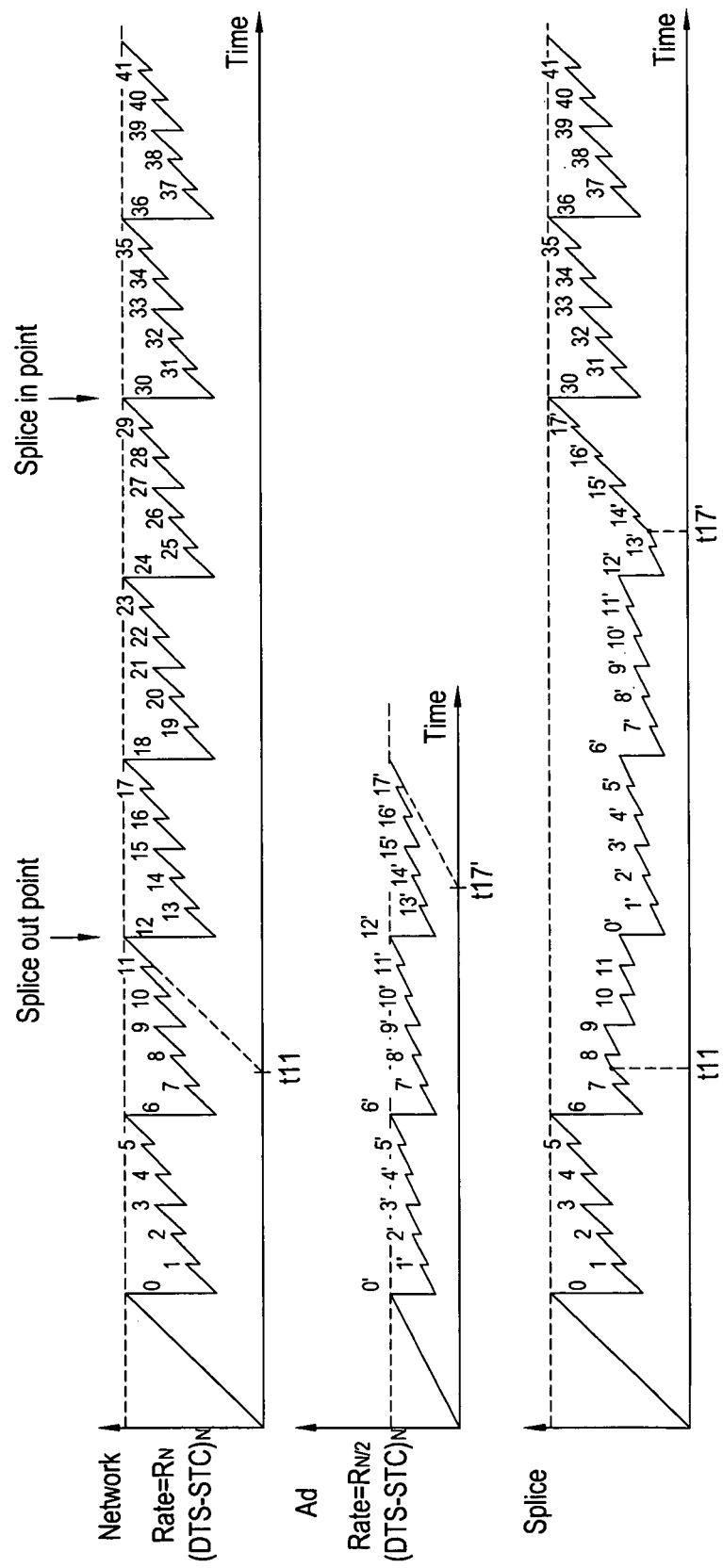
FIGS. 18-24 depict examples of the decoder buffer model for various combinations of bit rates and DTS–STC values of network feeds and ads in accordance with embodiments of the present invention.

$Rate_A < Rate_N$, $(DTS-STC)_A = (DTS-STC)_N$ (FIG. 18)

Since the DTS–STC distance of the ad is already identical to that of the network feed, there is no shift in decoder buffer delay for the ad. At the splice out point, the decoder buffer level drops to that of the original ad. At the network in point, the decoder buffer level rises back to that of the network feed.

EXAMPLE 2

Figure 19:
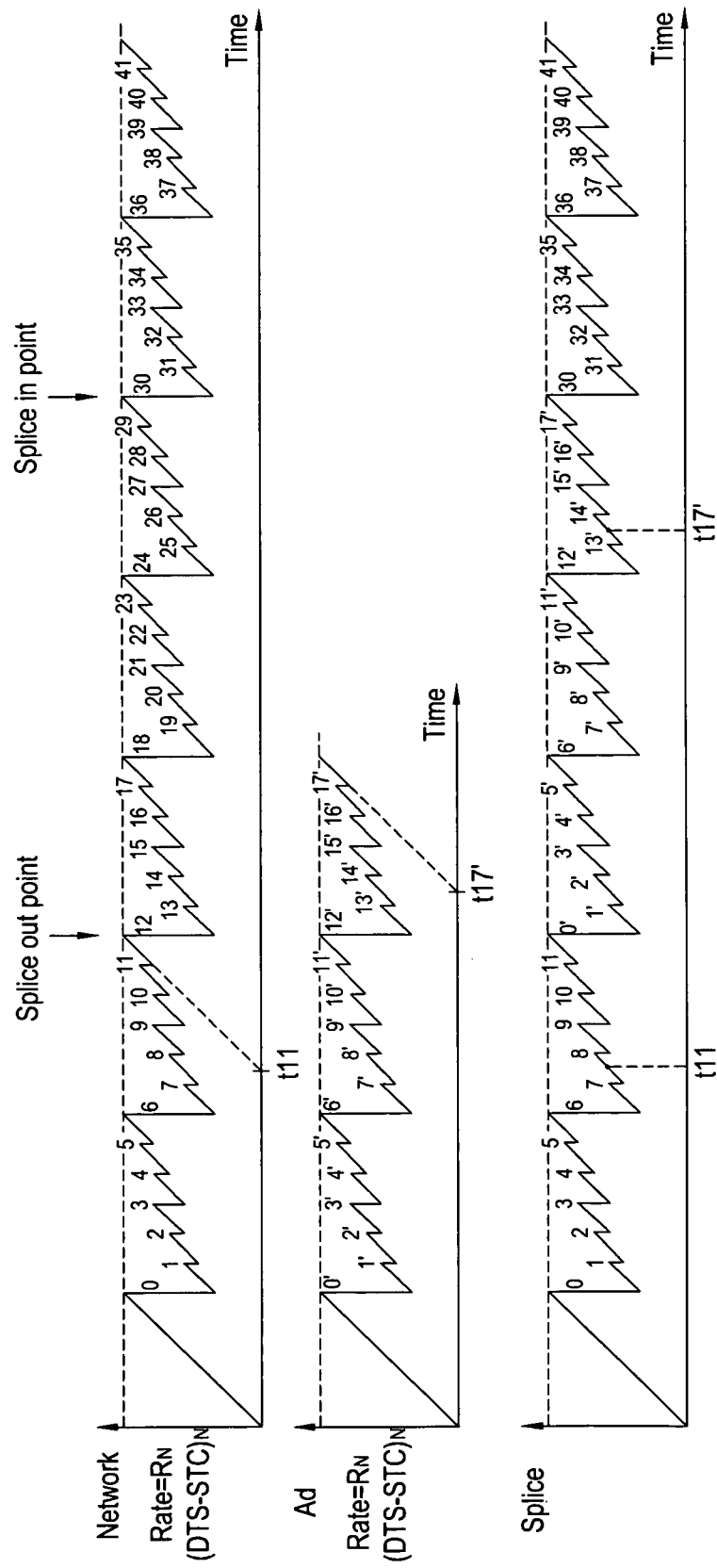

$Rate_A = Rate_N$, $(DTS-STC)_A = (DTS-STC)_N$ (FIG. 19)

Since the DTS–STC distance of the ad is already identical to that of the network feed, there is no shift in decoder buffer delay for the ad. Since the bit-rate of the ad is also identical to that of the network feed there is no drop in the decoder buffer level around the network out point and no rise around the network in point.

EXAMPLE 3

Figure 20:
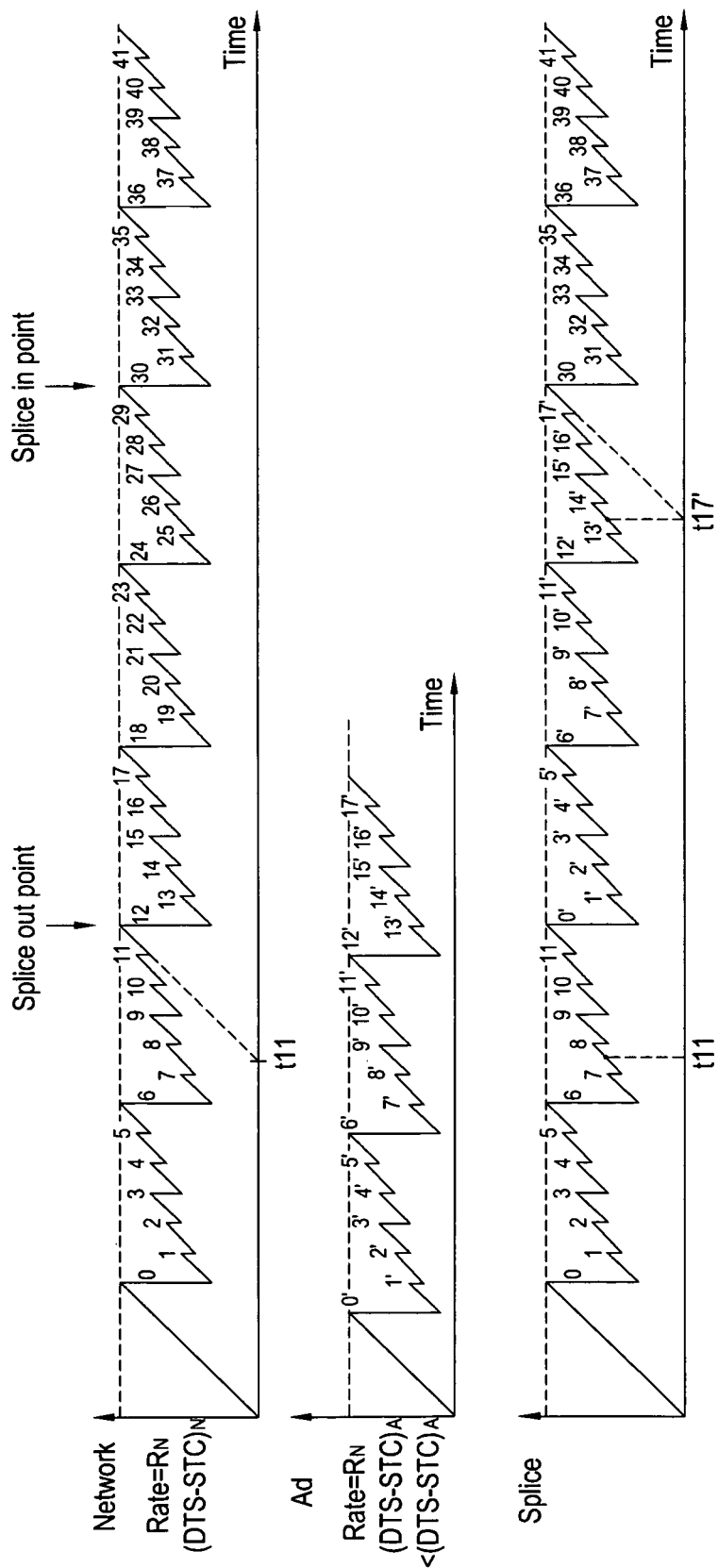

$Rate_A = Rate_N$, $(DTS-STC)_A < (DTS-STC)_N$ (FIG. 20)

Since $(DTS-STC)_A$ is less than $(DTS-STC)_N$, the buffer level of the ad after the splice out point will be higher than that of the original ad. Since the bit-rate of the ad is identical to that of the network feed there is no drop in the decoder buffer level around the network out point and no rise around the network in point.

EXAMPLE 4

Figure 21:
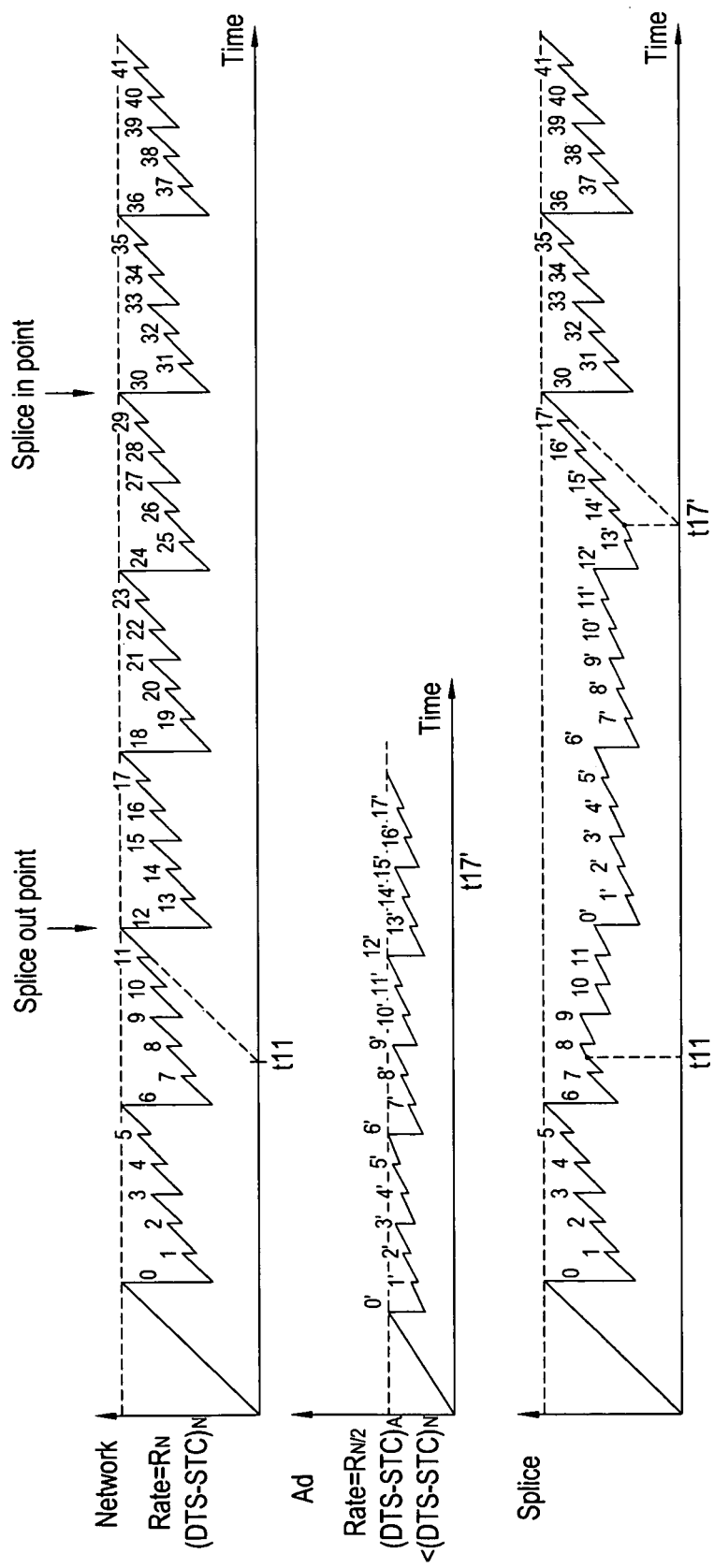

$Rate_A < Rate_N$, $(DTS-STC)_A < (DTS-STC)_N$ (FIG. 21)

Since $(DTS-STC)_A$ is less than $(DTS-STC)_N$, the buffer level of the ad after the splicing will be higher than that of the original ad. Because of the difference in bit-rate between ad and network feed, a drop in buffer level occurs at the network out point and the level rises again at the network in point.

EXAMPLE 5

$Rate_A = Rate_N$, $(DTS-STC)_A > (DTS-STC)_N$ (FIG. 22)

In this case decoder buffer underflow can occur.

EXAMPLE 6

$Rate_A > Rate_N$, $(DTS-STC)_A = (DTS-STC)_N$ (FIG. 23)

In this case decoder buffer overflow can occur. This problem could be avoided by signaling a maximum decoder buffer level in the network feed that is at least as large as that of the ad. Note that this situation can occur for capped VBR streams where the bit-rate of the network feed is lower than the bit-rate of the ad around the splice points.

EXAMPLE 7

$Rate_A = Rate_N$, $(DTS-STC)_A < (DTS-STC)_N$, DTS–STC not at maximum value at the start of the ad
(FIG. 24)

In this example ad constraint 3 is not fulfilled. As can be seen, this can cause buffer overflow.

3.2.4 Buffer Level Correction in Splicer 120

In order to have seamless splices, the network feed and ad encoders (e.g., 110, 112) must condition the decoder buffer level at the splice points as discussed above. The encoders 110, 112, however, have a limited accuracy with which this conditioning is done and therefore a small error will be introduced for each splice operation.

If there are a lot of sequential splices, this small error may accumulate and a large error may be obtained which may result in decoder buffer overflow or underflow. Therefore, splicer 120 must have a way to correct the inaccuracy of the encoder.

Errors in decoder buffer level will occur if the DTS–STC values at the beginning and end of the ad are not equal or if the DTS–STC values of the RAP frames of the network feed are not equal. This is illustrated in FIG. 7.

Remember that the DTS–STC value of the RAP frame at the network in point is in general given by the following formula:

$$(DTS-STC)_{A2} + [(DTS-STC)_{N1} - (DTS-STC)_{A1}]$$

or $$(DTS-STC)_{N1} + [(DTS-STC)_{A2} - (DTS-STC)_{A1}]$$

The DTS–STC value of this RAP frame in the original network feed is equal to $(DTS-STC)_{N2}$.

The difference between the value after ad insertion and the original value and is then given by:

Buffer_Delay_Error=[(DTS−STC)$_{N1}$−(DTS−STC)$_{N2}$]+ [(DTS−STC)$_{A2}$−(DTS−STC)$_{A1}$]

or

Buffer_Delay_Error=$\Delta_N$+$\Delta_A$ with $\Delta_A$=(DTS−STC)$_{A2}$−(DTS−STC)$_{A1}$ $\Delta_N$=(DTS−STC)$_{N1}$−(DTS−STC)$_{N2}$ In order for a splice to be seamless and to have no effect on the decoder buffer level $\Delta_N$+$\Delta_A$ must be equal to 0. If $\Delta_N$+$\Delta_A$ is different from 0, a shift will occur in the decoder buffer level:

If $\Delta_N$+$\Delta_A$>0, the decoder buffer will increase and a possible overflow situation will occur.

If $\Delta_N$+$\Delta_A$<0, the decoder buffer will decrease and a possible underflow situation will occur.

Overflow and underflow situations can be corrected by applying one of any known techniques.

The easiest solution to solve a buffer overflow problem ($\Delta_N$+$\Delta_A$>0) is to introduce a delay between the end of the ad and the beginning of the network feed. By introducing a delay (i.e. adding null packets to the TS at the network in point) the STC value increases by an amount equal to the delay and as a consequence the DTS−STC value decreases. In order to have a perfect splice, the correction delay must be equal to $\Delta_N$+$\Delta_A$. This value can be easily calculated by the splicer 120.

The easiest solution to solve a buffer underflow problem ($\Delta_N$+$\Delta_A$<0) is to insert a glue frame between the end of the ad and the beginning of the network feed. The problem is that glue frames may not be acceptable.

In order to avoid the glue frames, the encoder 110, 112, could make sure that the error that it introduces is always positive ($\Delta_N$+$\Delta_A$>0). If the encoder knows its inaccuracy, it can overcompensate this in such a way that both $\Delta_N$>0 and $\Delta_A$>0 which makes $\Delta_N$+$\Delta_A$>0. Splicer 120 can then fine-tune the decoder buffer level by introducing a delay.

Figure 25:
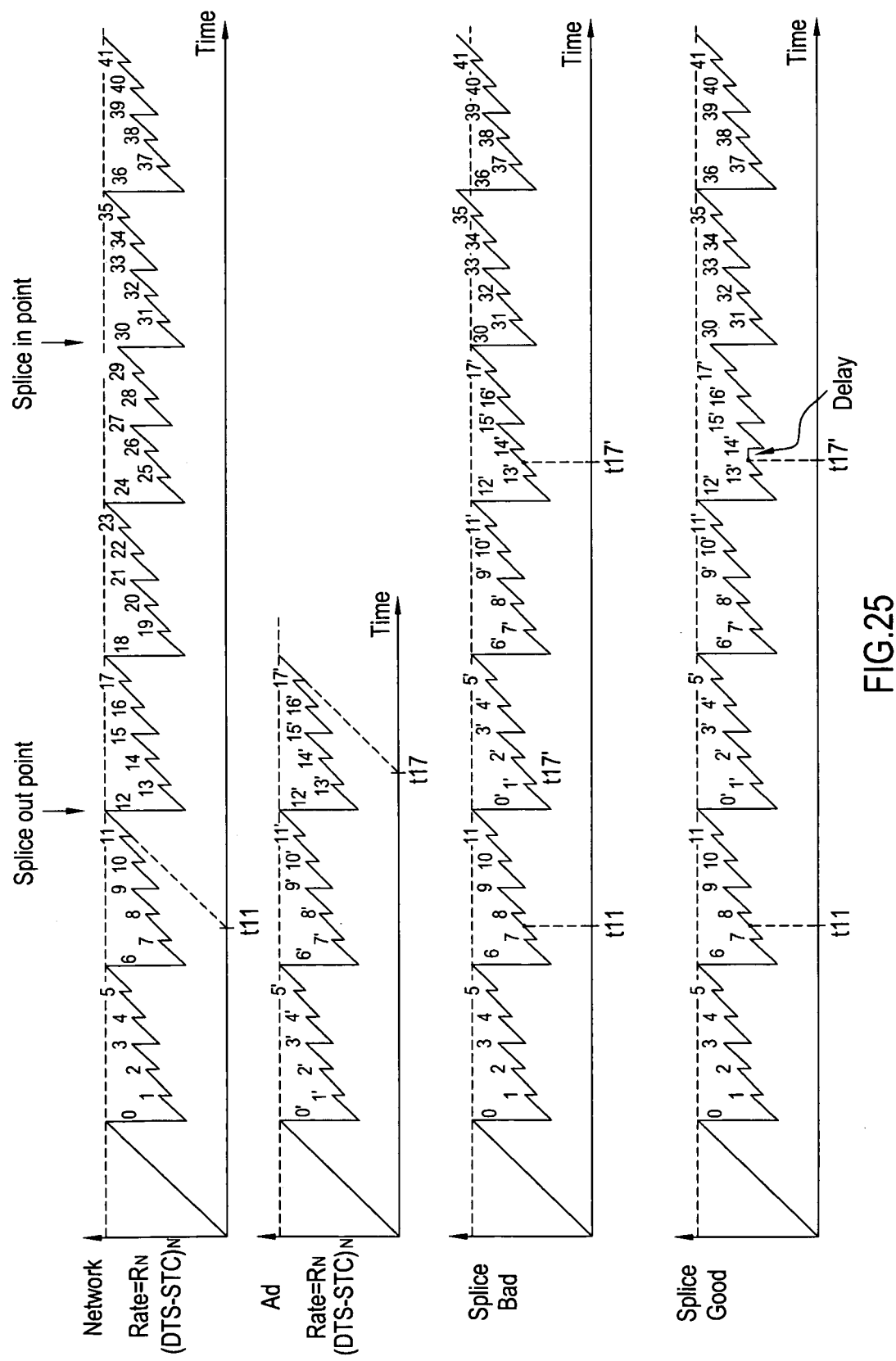
FIGS. 25 and 26 depict the use of a delay to address buffer overflow in accordance with embodiments of the present invention.

FIG. 25 shows an example where $\Delta_A$=0 and $\Delta_N$>0. The first spliced feed shows that buffer overflow occurs. In the second spliced feed a small delay is introduced between the ad and the network feed (horizontal line in buffer model), which solves the overflow problem.

Figure 26:
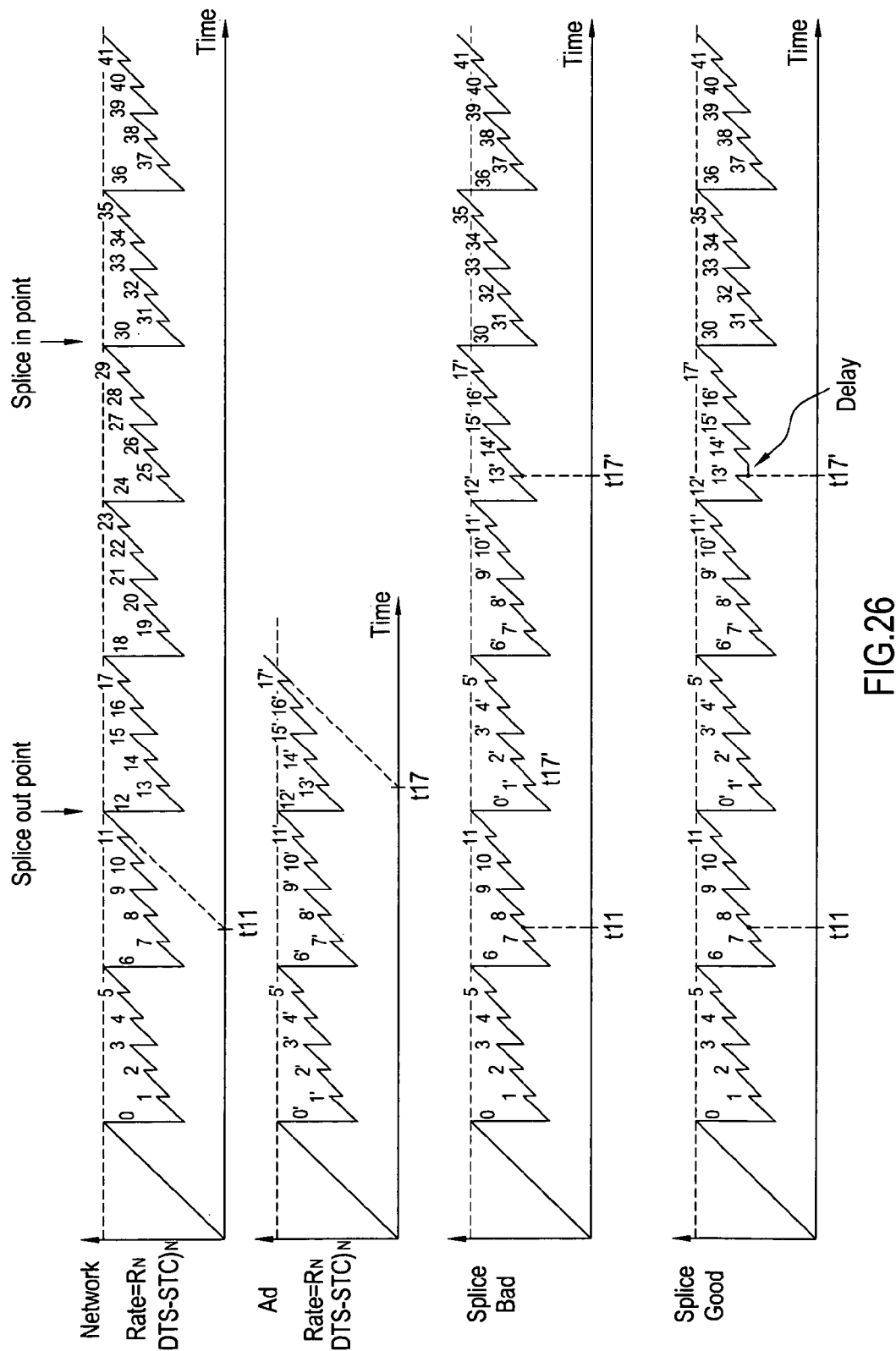

FIG. 26 shows the case where $\Delta_A$>0 and $\Delta_N$=0. The first spliced feed shows that buffer overflow occurs. In the second spliced feed a small delay is introduced between the ad and the network feed (horizontal line in buffer model), which solves the overflow problem.

3.3 Decoder Buffer Pre-conditioning for Program Switching 3.3.1 Decoder Buffer Pre-conditioning Constraints The following constraints are needed on both video feeds to guarantee a seamless splice.

Figure 27:
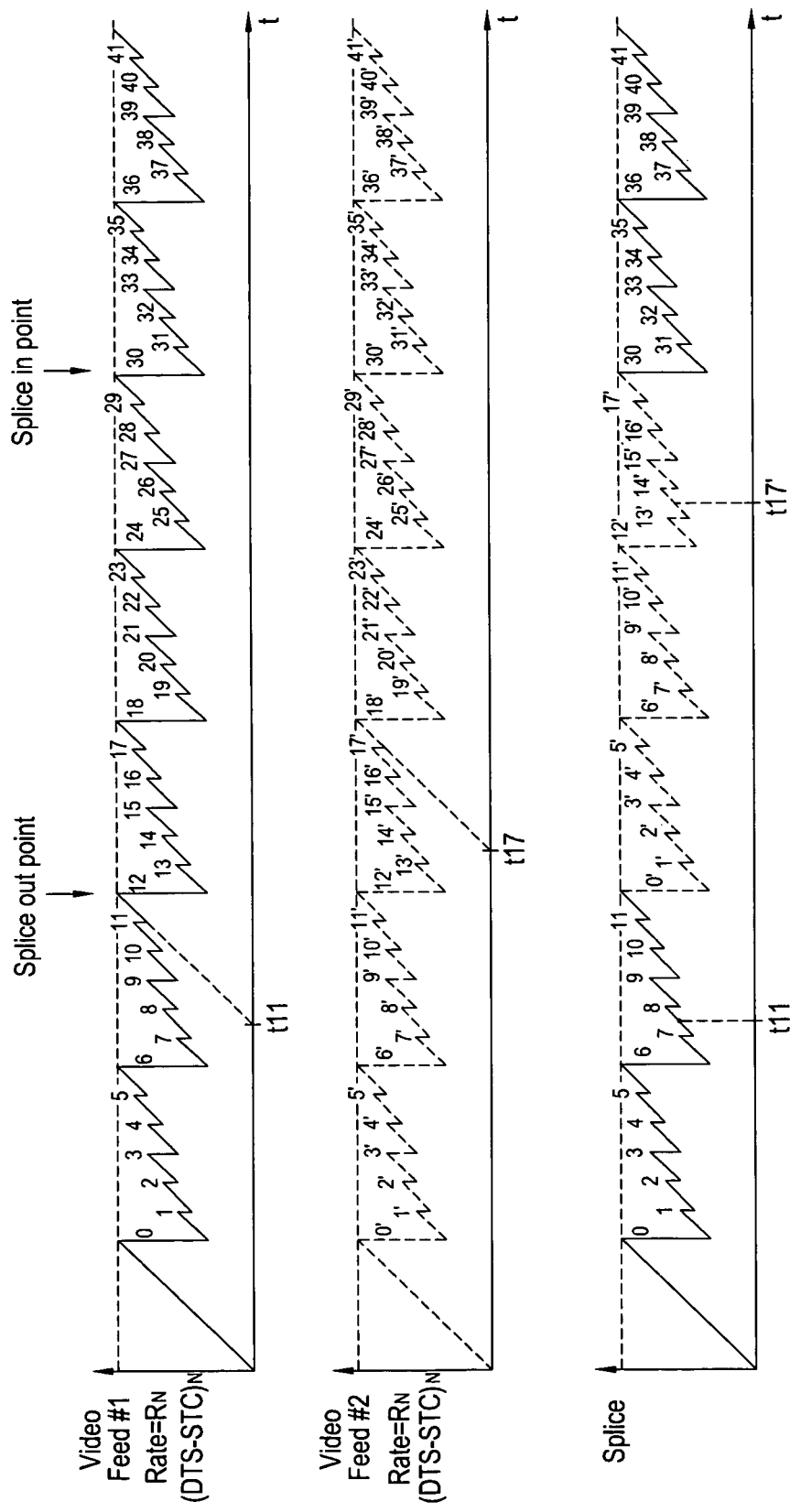
FIG. 27 shows buffer level before and after a splicing operation in accordance with an embodiment of the present invention.

1. (DTS−STC) value is equal for both video feeds at the Random Access Point (RAP) frames that are inserted by the pre-conditioning encoders at the splice points.
2. (DTS−STC) value of all frames other than the RAP frames at the splice points is less than or equal to the (DTS−STC) value of the RAP frames at the splice points.
3. The bitrate of both video feeds is equal From the discussion of the pre-conditioning for ad insertion, it should be obvious that in case the DTS-STC values at the RAP frames of both video feeds is equal and reaches a maximum value and the bitrate of both feeds is equal, the decoder buffer level for each video stream before and after the splicing operation will be equal. This can also be seen in FIG. 27.

3.4 Variable Bitrate Support

The goal of pre-conditioning is that the concatenation of head stream and tail stream at a splice results in a compliant output bit-stream, which does not cause any buffer overflow or underflow of the decoder buffer. For CBR (Constant Bit-Rate), the pre-conditioning is expressed in terms of the DTS−STC at splice points, and the DTS−STC multiplied by the constant bit-rate gives the decoder buffer level right before decoding the picture. In case of VBR (Variable Bit-Rate), there is no longer such a simple relation. So, for VBR, pre-conditioning in terms of DTS−STC is no longer possible. However, for VBR, all pre-conditioning constraints except constraint 4 for ads can be reformulated using the decoder buffer fullness at the time instant indicated by the DTS of a picture instead of using the DTS−STC. The fourth pre-conditioning constraint for ads is covered by the other constraints if they limit the decoder buffer fullness at splice points.

4. Splicer Implementation Examples 4.1 Pre-conditioned Ad Insertion

Figure 28:
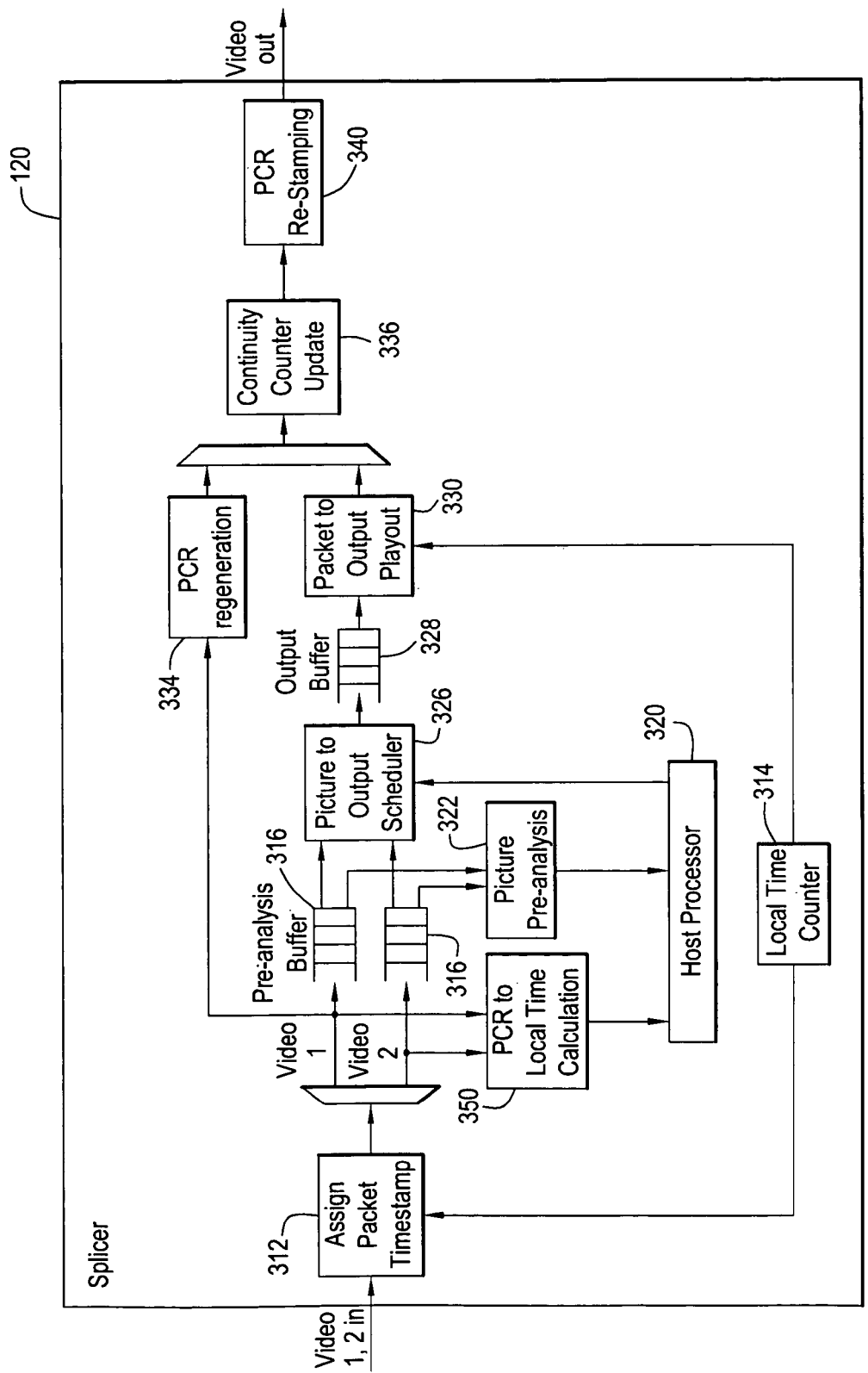
FIGS. 28-30 depict examples of splicers in accordance with embodiments of the present invention, with FIG. 28 for video ad insertion.

A possible implementation example for a pre-conditioning aware splicer than can perform pre-conditioned ad insertion is depicted in FIG. 28.

Of course, those skilled in the art will appreciate that other hardware (and software) configurations are considered to be within the scope of the present invention, and that the specific hardware configuration described herein should be considered to be a non-limiting example of one possible implementation.

With reference now to FIG. 28, video and audio TS packets arrive at the input port of splicer 120 as shown on the left of the Figure. Each incoming packet is assigned a Timestamp at block 312 that is derived from a Local Time counter 314 running from a local 27 MHz clock oscillator.

The video packets are de-multiplexed per program and written in pre-analysis buffers 316. Each incoming video program preferably has its own pre-analysis buffer, as shown. For each incoming video program, the PCR to Local Time Calculation block 350 calculates the offset between the System Time Clock (STC) of the video program and the Local Time counter 314 of splicer 120. This is done by comparing the incoming PCR fields of each video program with the Local Time counter 314. The results of the PCR to local Time offset calculation are forwarded to a host processor 320.

All pictures that are stored in the pre-analysis buffer 316 are processed by the Picture Pre-analysis block 322. This block 322 extracts all important parameters for each picture, such as e.g. DTS/PTS value, the timestamp of the first and last packet of the picture, MPEG-2 adaptation_field information and so on. All of these extracted parameters are forwarded to the host processor 320.

As soon as a picture is pre-analyzed, it can be moved by the host processor 320 from the pre-analysis buffer 316 to the output buffer 328 via the Picture to Output Scheduler 326. Pictures in the pre-analysis buffer 316 must be processed sequentially by the host processor 320. The host processor 320 tells the Picture to Output Scheduler 326 to forward the next picture in a certain pre-analysis buffer 316 to a certain output buffer 328. Each output buffer 328 corresponds with an outgoing video program.

The host processor 320 can also tell the Picture to Output Scheduler 326 to skip the next picture in a certain pre-analysis buffer 316. The Picture to Output Scheduler 326 will then read the picture and discard it.

It is the task of the host processor 320 to keep track of which pictures are in the pre-analysis buffer 316 and which have been forwarded to the output buffer 328.

In case of ad insertion, the host processor 320 instructs the Picture to Output Scheduler 326 to forward all pictures of the network feed to the output buffer 328 up to the network out point. From then on, the host processor 320 forwards the pictures of the ad to the output buffer 328, starting with the first picture in the pre-analysis buffer 316 of the ad. The host processor 320, at the same time, discards all pictures of the network feed until right before the network in point. If all ad pictures have been forwarded, the host processor 320 instructs the Picture to Output Scheduler 326 to forward the first picture in the pre-analysis buffer 316 of the network feed and will continue to do this until the next ad must be inserted.

Since the DTS and PTS values of network feed and ad are independent, the splicing operation described above would generate a DTS/PTS discontinuity at each splice point. In order to avoid this, for each picture that is forwarded to the output buffer 328 the host processor 320 provides a DTS/PTS offset value to the Picture to Output Scheduler 326. The latter uses this value to add to the DTS/PTS fields of the ad or network feed.

Note that there is no need to compensate a discontinuity in the PCR fields of the ad since these fields are not used and are made invalid by Picture to Output Scheduler 326.

Next to the DTS/PTS offset value, the host processor 320 also provides a Delay offset field for each picture. The Picture to Output Scheduler 326 adds the delay offset field to the Timestamp of all packets of the picture. The purpose of this operation is explained below.

Packets that are forwarded to the output buffer are read by the Packet to Output Playout block 330. This block makes sure that there is a fixed delay between the arrival of each packet in splicer 120 and the output of the Packet to Output Playout block 330. This is accomplished by comparing the Timestamp of each packet with the Local Time counter 314. If the difference between the Local Time counter 314 and the packet Timestamp is more than or equal to a predefined value (e.g., 1 second), the Packet to Output Playout block 330 removes the packet from the Output buffer 328 and sends it to the output of splicer 120.

The Delay offset field that is processed in the Picture to Output scheduler block 326 can be used by the host processor 320 to vary the delay of a picture through splicer 120. This variation is necessary at the splice points since the delay between the picture of the network feed at the network out point and the first picture of the ad coming from the ad server must be compensated.

All packets that are sent to the output of splicer 120 are processed in the Continuity Counter Update block 336. This block 336 makes sure that the continuity_counter values of the video and audio stream packets are continuous. Otherwise a discontinuity would be present at the splice points since the continuity_counter values of network feed and ad are independent.

Before the packets leave splicer 120, all PCR fields are re-stamped at PCR Re-stamping block 340 using information received from PCR Regeneration block 334 to compensate for the variable delay between the Continuity Counter Update block 336 and the output of splicer 120. More specifically, the PCR Regeneration block 334 also preferably generates PCR packets for the outgoing video streams. The PCR Regeneration block 334 preferably contains a digital PLL that is always locked to the PCR fields of the network feed. In a typical implementation, every 37 ms a new PCR packet is generated. The PCR fields that are part of the incoming video packets are suppressed.

4.2 Pre-conditioned Program Switching

Figure 29:
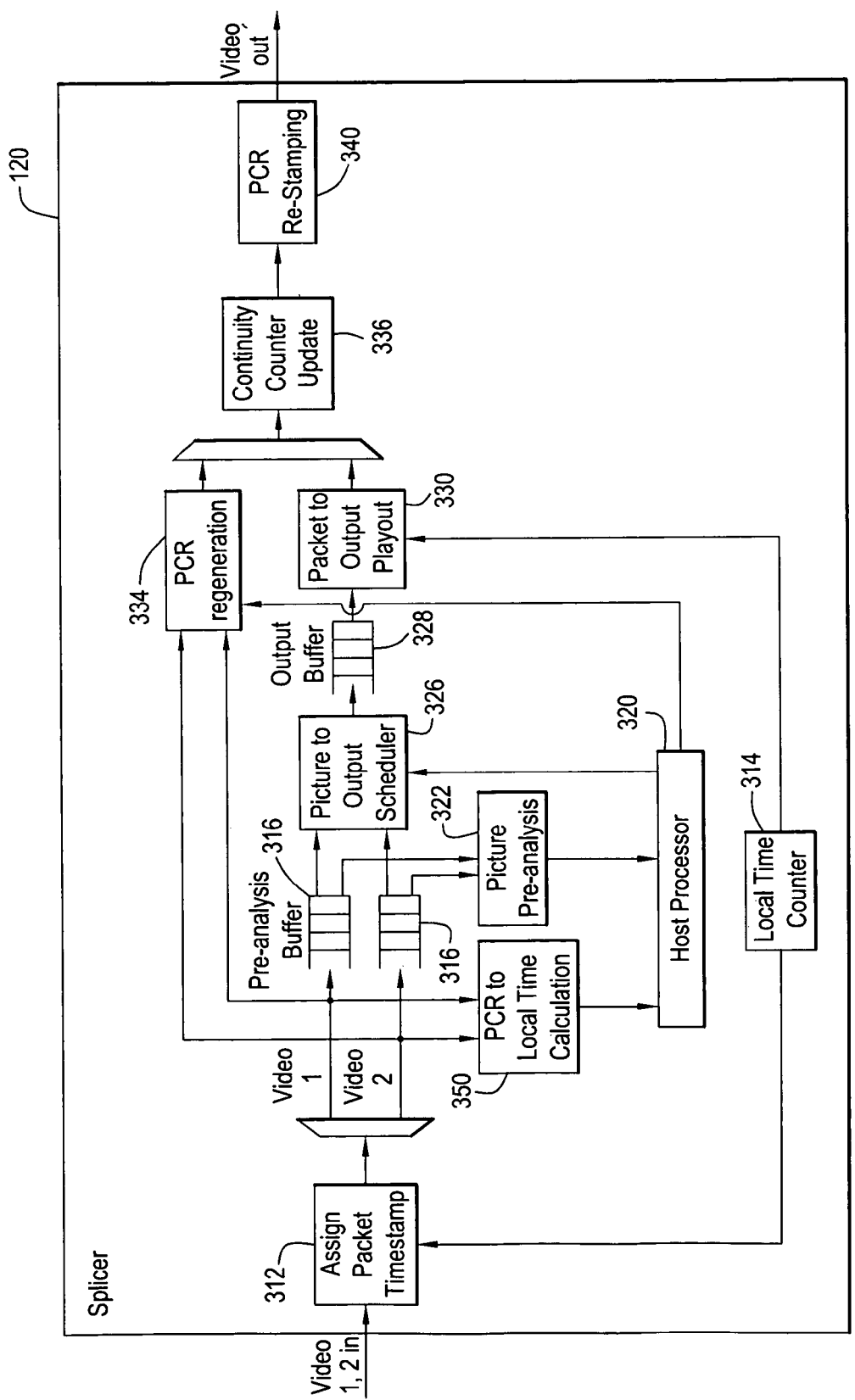

A possible implementation example for a pre-conditioning aware splicer than can perform pre-conditioned program switching is depicted in FIG. 29.

This implementation example is almost identical to that for pre-conditioned ad insertion (FIG. 28). The major difference with ad insertion is in the processing of the PCR, implemented in the PCR regeneration block.

When switching from video feed #1 to video feed #2, the PCR fields in the spliced output are also switched from that of video feed #1 to that of video feed #2. The host processor 320 signals when the PCR regeneration has to switch. In general there will be an offset between the PCR fields of both video feeds that must be compensated for after the switch in order to avoid a PCR discontinuity. The PCR offset value is calculated by the PCR regeneration block at the moment of the splice and this offset is added to the PCR fields of video feed #2. The same operation takes place when splicing from video feed #2 to video feed #1 but the newly calculated PCR offset value is then added to the PCR fields of video feed #1.

4.3 Audio Splicing for Ad-insertion and Program Switching

Figure 30:
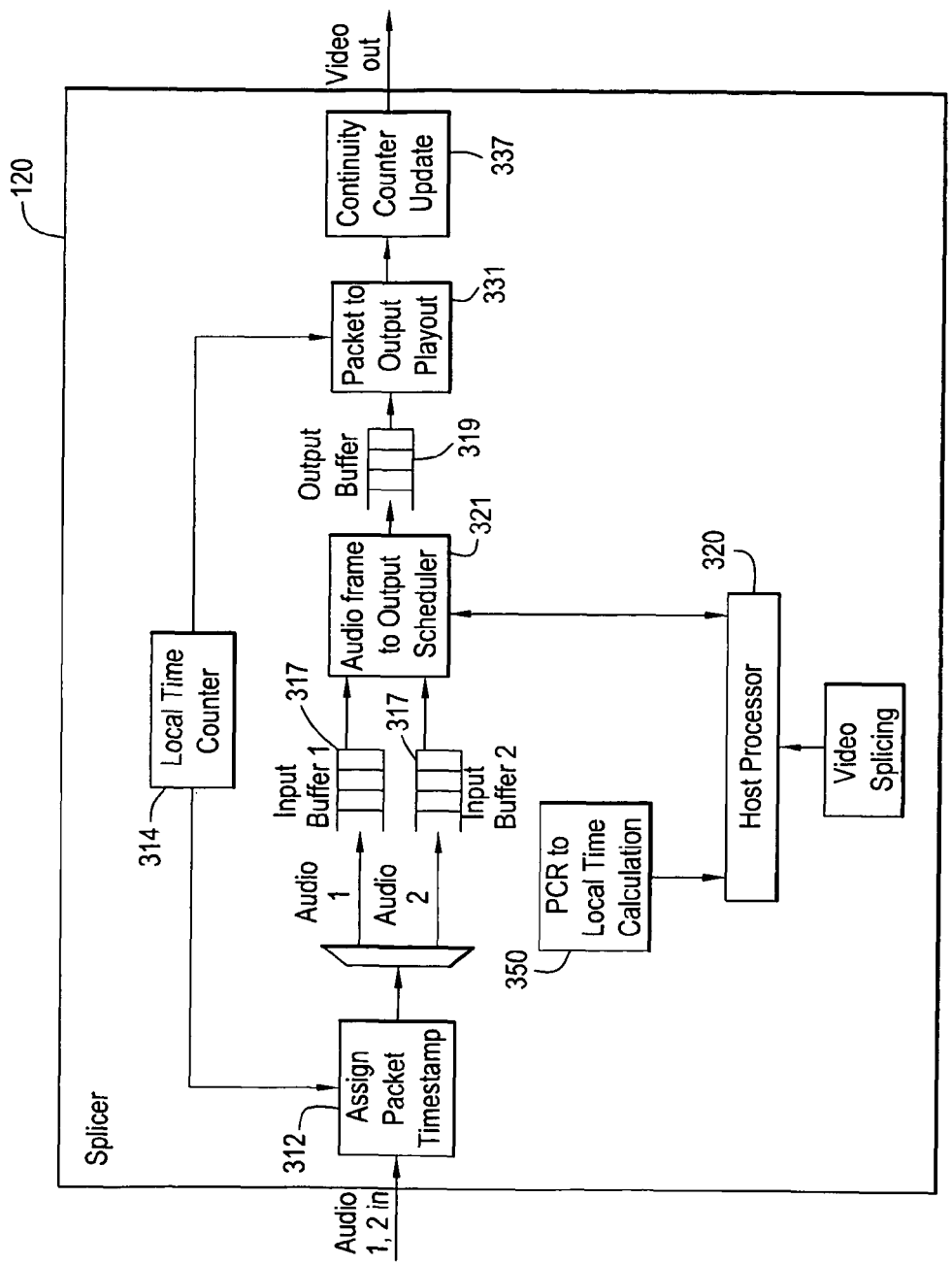

A possible implementation example for a pre-conditioning aware audio splicer is depicted in FIG. 30.

Of course, those skilled in the art will appreciate that other hardware (and software) configurations are considered to be within the scope of the present invention, and that the specific hardware configuration described herein should be considered to be a non-limiting example of one possible implementation.

With reference now to FIG. 30, audio TS packets arrive at the input port of splicer 120 as shown on the left of the Figure. Each incoming packet is assigned a Timestamp at block 312 that is derived from a Local Time counter 314 running from a local 27 MHz clock oscillator. This time stamp will be used to generate audio output with the same PTS−STC distance as in the audio input.

The audio packets are de-multiplexed per audio stream and written in input buffers 317. Each incoming audio program preferably has its own input buffer, as shown. For each incoming audio stream, the host processor 320 knows the PCR base that is applicable, and it can load the PCR to Local Time offset from the same Calculation block 350 as in video splicing.

The host processor 320 gets from the Audio Output Scheduler 321 the PTS of the next PES packet. This host processor 320 gives commands to the Audio Output Scheduler 321 when to forward that audio PES packet. Audio PES packets in the input buffer must be processed sequentially by the host processor 320. The host processor 320 tells the Audio Output Scheduler 321 to forward the next audio PES packet in a certain Input Buffer to a certain output buffer 319. Each output buffer 319 corresponds with an outgoing audio stream. There can correspond more than one audio stream to each video stream, e.g., for multiple languages accompanying a video stream.

The host processor 320 can also tell the Audio Output Scheduler 321 to skip the next PES packet in a certain input buffer. The Audio Output Scheduler 321 will then read the audio PES packet and discard it.

It is the task of the host processor 320 to keep track of which audio PES packets have been forwarded to the output buffer.

In case of a splice (for program switching or at start and end of an ad), the host processor 320 instructs the Audio Output Scheduler 321 to forward all audio PES packets of the head stream to the output buffer up to the splice point. The host processor also instructs the Audio Output Scheduler 321 to discard all audio PES packets of the tail stream up to the splice point, in case the tail stream has audio content before the splice point (this is not likely for an ad). From then on, the host processor 320 instructs to forward the audio PES packets of the tail stream to the output buffer 319, starting with the first audio PES packet after the splice point in the input buffer of the tail stream. The host processor 320, at the same time, instructs to discard all audio PES packets of the head stream. In case of ad insertion, at the end of the ad, the same process will happen again, but now the roles of head and tail stream will be reversed between network feed and ad stream.

The host processor knows from the video splicing where the corresponding splice points in audio are. Based on the PTS of the first PES head and tail packet after the splice point, and based on the PCR-to-Local-Time distance for each stream, the host processor has to keep track of the relative shift of audio w.r.t. video, and it has to modify the audio splice time of later audio splices to compensate an accumulated shift error.

Since the PTS values of network feed and ad are independent, the splicing operation described above would generate a PTS discontinuity at each splice point. In order to avoid this, for each PES packet header that is forwarded to the output buffer, the host processor 320 provides a PTS offset value to the Audio Output Scheduler 321.

The Audio Output Scheduler 321 gives each outgoing TS packet a time stamp indicating when the Packet to Output Playout 331 has to send the TS packet to the splicer output. To guarantee streaming continuity at the output, the host processor keeps track of the final output time stamp of each PES packet, and instructs the Audio Output Scheduler 321 what time stamp offset to use.

All packets that are sent to the output of splicer 120 are processed in the Continuity Counter Update block 337. This block makes sure that the continuity_counter values of the audio stream packets are continuous. Otherwise a discontinuity would be present at the splice points since the continuity_counter values of head and tail stream are independent.

Although the present invention has been described in the context of elementary stream (ES) level encrypted video content, the present invention will also operate on unencrypted ES level video/audio content. That is, the present invention solves the problem of splicing encrypted content, but will work as well in the unencrypted context.

It will be apparent to those skilled in the art that various modifications and variations can be made in the systems and methods described herein consistent with the principles of the present invention without departing from the scope or spirit of the invention. Although several embodiments have been described above, other variations are possible consistent with the principles of the present invention.

Other embodiments of the invention will be apparent to those skilled in the art from consideration of the specification and practice of the disclosed embodiments. The specification and examples are exemplary only, and the true scope and spirit of the invention is defined by the following claims and their equivalents.

What is claimed is:

1. A method of splicing into a first video feed, a second video feed, the method comprising:
   receiving a first video feed at an encoder, and encoding the first video feed to generate an encoded first transport stream;
   passing the encoded first transport stream to a splicer;
   receiving a splice trigger at the encoder and generating a cue message that includes a Presentation Time Stamp (PTS) value that corresponds with a PTS value of an intended splice point in the first video feed;
   in response to the splice trigger, conditioning the first video feed by further encoding the first video feed such that a decoder buffer delay defined by DTS-STC, wherein DTS is a Decoding Time Stamp and STC is a System Time Clock, is equivalent to a predetermined value at a video frame that corresponds to the intended splice point;
   processing, by the encoder, the video frame that corresponds with the intended splice point by closing group of picture (GOP) and encoding the video frame as a random access point(RAP);
   encrypting the first video feed prior to executing a splice, wherein encrypting the first video feed comprises encrypting the first video feed and the cue message; and
   executing the splice at the intended splice point by switching to a second video feed, wherein the second video feed is conditioned in a manner identically to the first video feed such that a seamless splice is achieved without decoder buffer overflow or underflow.

2. The method of claim 1, wherein the first video feed is encoded in accordance with MPEG-2.

3. The method of claim 1, further comprising encoding a first audio feed that is associated with the first video feed.

4. The method of claim 3, further comprising, in response to the splice trigger, generating a plurality of audio random access points (RAPS) from the first audio feed around the intended splice point.

5. The method of claim 4, further comprising:
   generating all audio frames within the splice point,
   encoding each of the all audio frames as audio RAP; and
   mapping each of audio frames into a separate packetized elementary stream (PES) packet each starting a new MPEG-2 packet.

6. The method of claim 1, wherein the conditioning comprises applying predetermined constraints to the first video feed and the second feed.

7. The method of claim 6, wherein one of the predetermined constraints applied to the first video feed is that the DTS-STC value is equal at a beginning and at an end of an avail.

8. The method of claim 6, wherein one of the predetermined constraints applied to the first video feed is that the DTS-STC value of all frames between RAP frames of the first video feed is less than or equal to the DTS-STC value of the RAP frames.

9. The method of claim 6, wherein one of the predetermined constraints applied to the second video feed is that the DTS-STC value is equal at a beginning and an end of a spliced segment of the second video feed.

10. The method of claim 6, wherein one of the predetermined constraints applied to the second video feed is that the DTS-STC value at a beginning and an end of a segment of the second video feed is less than or equal to the DTS-STC value of the first video feed at intended splice points.

11. The method of claim 6 wherein one of the predetermined constraints applied to the second video feed is that the DTS-STC value of all frames between a beginning and an end of a segment of the second video feed is less than or equal to the DTS-STC value at a beginning and an end of the segment of the second video feed, 12. The method of claim 6, wherein one of the predetermined constraints applied to the second video feed is that a bit rate of the second video feed is lower than or equal to a bit rate of the first video feed.

13. The method of claim 1, wherein the first video feed is a network feed.

14. The method of claim 1, wherein the second video feed is an advertisement.

15. The method of claim 1, further comprising compensating for a difference in timebase between the first video feed and the second video feed by increasing or decreasing a speed of streaming of one or both video feeds, based on their difference with respect to a system dock frequency.

16. The method of claim 1, further comprising correcting errors that result from a limited accuracy with which the conditioning can be executed in an encoder, by adding an offset to the DTS-STC value at the splice point.

17. The method of claim 16, further comprising inserting a delay at the splice point.

18. The method of claim 1, further comprising providing the splicer information to decrypt the cue message.

19. The method of claim 1, wherein the RAP frame is mapped into a new packetized elementary stream (PES) packet which, in turn, starts a new MPEG-2 packet.

20. A method of performing a splice operation on an encrypted MPEG-2 transport stream, comprising:
  receiving a splice trigger and generating a corresponding cue message that is intended to be received by a splicer;
  in response to the splice trigger, encoding a network feed such that a decoder buffer delay reaches a predefined value at a video frame of the network feed that corresponds to a splice point indicated by the corresponding cue message, wherein the predefined value is defined by DTS-STC, wherein DTS is a Decoding Time Stamp and STC is a System Time Clock;
  processing, by the encoder, the video frame that corresponds with the intended splice point by closing group of picture (GOP) and encoding the video frame as a random access point (RAP);
  encrypting the network feed and supplying a resulting encrypted MPEG-2 transport stream to the splicer, wherein encrypting the first video feed comprises encrypting the first video feed, and the corresponding cue message; and
  splicing into the network feed at the splice point another MPEG-2 transport stream, wherein the another MPEG-2 transport stream is encoded such that a decoder buffer delay at a video frame of the another MPEG-2 transport stream corresponding to the splice point is the same as the predefined value.

21. The method of claim 20, wherein the network feed comprises a first program, and the another MPEG-2 transport stream comprises a second, different, program.

22. The method of claim 20, wherein the another MPEG-2 transport stream is an advertisement.

23. The method of claim 20, further comprising applying predetermined constraints to the network feed.

24. The method of daim 23, wherein one of the predetermined constraints applied to the network feed is that the DTS-STC value is equal at a beginning and at an end of an avail.

25. The method of claim 23, wherein one of the predetermined constraints applied to the network feed is that the DTS-STC value of all frames between RAP Thames of the network feed is less than or equal to the DTS-STC value of the RAP frames.

26. The method of claim 20, wherein the another MPEG-2 transport stream is a program, the method further comprising applying predetermined constraints to the network feed and the another MPEG-2 transport stream.

27. The method of claim 26, wherein one of the predetermined constraints is that a DTS-STC value is equal For both the network feed and the another MPEG-2 transport stream at Random Access Point (RAP) frames.

28. The method of claim 26, wherein one of the predetermined constraints is that a DTS-STC value of all frames other than Random Access Point (RAP) frames a the splice point is less than or equal to the DTS-CTC value of RAP frames at the splice point.

29. The method of claim 26, wherein one of the predetermined constraints is that a bit rate of each of the network feed and the another MPEG-2 transport stream are equal.

30. The method of claim 20, further comprising, in response to the splice trigger, generating a plurality of audio random access points (RAPs) from a first audio feed that is associated with the network feed around the splice point.

31. The method of claim 30, wherein the plurality of audio RAPs are generated within a predetermined timeframe around the splice point.

32. The method of claim 31, wherein the predetermined timeframe is around one second.

33. A non transitory tangible media for execution and when executed operable to:
  receive a splice trigger and generating a corresponding cue message that is intended to be received by a splicer;
  in response to the splice trigger, encode a network feed such that a decoder buffer delay reaches a predefined value at a video frame of the network feed that corresponds to a splice point indicated by the corresponding cue message, wherein the predefined value is defined by DTS-CTC, wherein DTS is a Decoding Time Stamp and STC is a System Time Clock;
  processing, by the encoder, the video frame that corresponds with the intended splice point by closing group of picture (GOP) and encoding the video frame as a random access point (RAP);
  encrypt the network feed and supplying a resulting encrypted MPEG-2 transport stream to the splicer, wherein encrypting the first video feed comprises encrypting the first video feed, and encrypting the corresponding cue message; and
  splice into the network feed at the splice point another MPEG-2 transport stream, wherein the another MPEG-2 transport stream is encoded such that a decoder buffer delay at a video frame of the another MPEG-2 transport stream corresponding to the splice point is the same as the predefined value.

\* \* \* \* \*